United States Patent
Krause et al.

(10) Patent No.: US 7,171,484 B1
(45) Date of Patent: Jan. 30, 2007

(54) RELIABLE DATAGRAM TRANSPORT SERVICE

(76) Inventors: Michael R. Krause, 220 Hawk Ridge Rd., Boulder Creek, CA (US) 95006; David J. Garcia, 24100 Hutchinson Rd., Los Gatos, CA (US) 95033; Paul R. Culley, 11210 Olde Mint House La., Tomball, TX (US) 77375; Renato J. Recio, 11400 Burnett Rd., Austin, TX (US) 78758; Alan F. Benner, 19 Ridgeview Rd., Poughkeepsie, NY (US) 12603

( * ) Notice: Subject to any disclaimer, the term of this patent is extended or adjusted under 35 U.S.C. 154(b) by 0 days.

(21) Appl. No.: 09/980,759

(22) PCT Filed: May 24, 2000

(86) PCT No.: PCT/US00/14222

§ 371 (c)(1),
(2), (4) Date: Apr. 11, 2002

(87) PCT Pub. No.: WO00/72575

PCT Pub. Date: Nov. 30, 2000

(51) Int. Cl.
*G06F 15/16* (2006.01)

(52) U.S. Cl. ..................................... 709/232

(58) Field of Classification Search ........ 709/230–232, 709/238; 370/412–413, 390
See application file for complete search history.

(56) References Cited

U.S. PATENT DOCUMENTS

| | | | |
|---|---|---|---|
| 4,475,192 A | 10/1984 | Fernow et al. |
| 4,527,267 A | 7/1985 | Cohen |
| 4,713,806 A | 12/1987 | Oberlander et al. |
| 4,999,771 A | 3/1991 | Ralph et al. |
| 5,297,143 A | 3/1994 | Fridrich et al. |
| 5,408,465 A | 4/1995 | Gusella et al. |
| 5,506,964 A | 4/1996 | Beukema |
| 5,535,341 A | 7/1996 | Shah et al. |
| 5,553,083 A | 9/1996 | Miller |
| 5,699,500 A | 12/1997 | Dasgupta |
| 5,699,501 A | 12/1997 | Badovinatz et al. |
| 5,781,910 A | 7/1998 | Gostanian et al. |
| 5,790,544 A | 8/1998 | Aho et al. |
| 5,799,146 A | 8/1998 | Badovinatz et al. |
| 5,802,295 A | 9/1998 | Fukui et al. |
| 5,916,307 A * | 6/1999 | Piskiel et al. ................ 719/314 |
| 5,926,101 A | 7/1999 | Dasgupta |
| 5,968,176 A | 10/1999 | Nessett et al. |
| 5,987,506 A | 11/1999 | Carter et al. |

(Continued)

OTHER PUBLICATIONS

RFC 793—Transmission Control Protocol, Sep. 1981.*

(Continued)

*Primary Examiner*—Krisna Lim
*Assistant Examiner*—Sean Reilly

(57) ABSTRACT

A distributed computer system includes a source endnode including a source process which produces message data and a send work queue having work queue elements that describe the message data for sending. A destination endnode includes a destination process and a receive work queue having work queue elements that describe where to place incoming message data. A communication fabric provides communication between the source endnode and the destination endnode. An end-to-end context is provided at the source endnode and the destination endnode storing state information to ensure the reception and sequencing of message data sent from the source endnode to the destination endnode permitting reliable datagram service between the source endnode and the destination endnode.

20 Claims, 12 Drawing Sheets

U.S. PATENT DOCUMENTS

| | | | |
|---|---|---|---|
| 5,999,964 A * | 12/1999 | Murakata et al. | 709/201 |
| 6,006,254 A | 12/1999 | Waters et al. | |
| 6,026,448 A | 2/2000 | Goldrian et al. | |
| 6,047,323 A | 4/2000 | Krause | |
| 6,064,672 A | 5/2000 | Van Loo et al. | |
| 6,070,219 A * | 5/2000 | McAlpine et al. | 710/263 |
| 6,088,736 A * | 7/2000 | Manning et al. | 709/234 |
| 6,092,220 A | 7/2000 | Palmer et al. | |
| 6,094,437 A | 7/2000 | Loehndorf, Jr. et al. | |
| 6,119,163 A | 9/2000 | Monteiro et al. | |
| 6,151,696 A | 11/2000 | Miller et al. | |
| 6,192,417 B1 | 2/2001 | Block et al. | |
| 6,205,150 B1 | 3/2001 | Ruszczyk | |
| 6,256,740 B1 | 7/2001 | Muller et al. | |
| 6,279,084 B1 | 8/2001 | VanDoren et al. | |
| 6,335,933 B1 | 1/2002 | Mallory | |
| 6,392,993 B1 | 5/2002 | Hamilton et al. | |
| 6,738,821 B1 | 5/2004 | Wilson et al. | |

OTHER PUBLICATIONS

IBM Corp. "Direct Memory Access Tag Architecture," IBM Technical Disclosure Bulletin, vol. 32, No. 4B, pp. 143-151 (Sep. 1989).

A copy of the PCT International Search Report mailed Jan. 2, 2001, for International Application No. PCT/US00/14222 (6 pages).

Aguilar, Lorenzo, "Datagram Routing for Internet Multicasting," ACM, vol. 14, Issue 2, pp. 58-63 (Jun. 1984).

Aldrich, John M. et al., "How to Program a Set of Bits?" Google, Google Groups: comp.lang.c++, pp. 1-4 (Oct. 1997). <http://groups-beta.google.com>.

Armstrong, S. et al., "Multicast Transport Protocol," Network Group, Request for Comments: 1301, pp. 1-29 (Feb. 1992). <http://www.faqs.org/rfcs/rfc1301.html>.

Chang, Jo-Mei et al., "Reliable Broadcast Protocols," ACM Transactions on Computer Systems, vol. 2, No. 3, pp. 251-273 (Aug. 1984).

Cheriton, David R. et al., "Host Groups: A Multicast Extension for Datagram Internetworks," ACM, pp. 172-179 (1985).

Crowcroft, J. et al., "A Multicast Transport Protocol," ACM Press, pp. 247-256 (1988).

Diot, Christophe, "Reliability in Multicast Services and Protocols; A Survey," International Conference on Local and Metropolitan Communication Systems, 19 pages (Dec. 1994).

Fenner, W., "Internet Group Management Protocol, Ver. 2," Network Working Groups, Request for Commens: 2236, pp. 1-18 (Nov. 1997). <http://www.faqs.org/rfcs/rfc2236.html>.

Mockapetris, Paul V., "Analysis of Reliable Multicast Algorithms for Local Networks," ACM, pp. 150-157 (1983).

Paul, Sanjoy et al., "Reliable Multicast Transport Protocol (RMTP)," IEEE Journal on Selected Areas in Communications, vol. 15, No. 3, pp. 407-421 (Apr. 1997).

Shay, William A., "Understanding Data Communications and Networks," PWS Publishing Company, Chapter 5, pp. 260-281 (1995).

Rosenberg, Jerry M., "Dictionary of Computers, Information Processing, and Telecommunications," 2nd Edition, pp. 149, 150, and 155, (Aug. 1987).

* cited by examiner

RELIABLE DATAGRAM TRANSPORT SERVICE

THE FIELD OF THE INVENTION

The present invention generally relates to data processing, and more particularly to communication between distributed processes via a reliable datagram service.

BACKGROUND OF THE INVENTION

In conventional distributed computer systems, distributed processes, which are on different nodes in the distributed computer system, typically employ transport services, such as a reliable connection service or an unreliable datagram service, to communicate, a source process on a first node communicates messages to a destination process on a second node via a transport service. A message is herein defined to be an application-defined unit of data exchange, which is a primitive unit of communication between cooperating sequential processes. Messages are typically packetized into frames for communication on an underlying communication services/fabrics. A frame is herein defined to be one unit of data encapsulated by a physical network protocol header and/or trailer.

A conventional reliable connection service creates at least one non-sharable resource connection between each connected pair of communicating distributed processes. Each non-sharable resource connection includes a unique set of non-sharable resources. The reliable connection service transmits frames between distributed processes by identifying a source connection handle and by issuing appropriate instructions to control data transmission. Reliable connection services provide reliable communication between distributed processes, but at the cost of scalability of the data processing system. In reliable connection services, communication at any one time is restricted to one-to-one distributed process relationships via corresponding non-sharable resource connections.

A conventional unreliable datagram service creates a shared resource datagram. The shared resource datagram can be employed to transmit frames between multiple distributed processes. The unreliable datagram services provide for highly scalable data processing systems, but at the cost of reliability. In an unreliable datagram service, the distributed process relationships can be one-to-one, one-to-many, or many-to-one, but communication between distributed processes is not reliable. In particular, traditional unreliable datagrams do not provide guaranteed ordering of frames transmitted between distributed processes.

For reasons stated above and for other reasons presented in greater detail in the Description of the Preferred Embodiments section of the present specification, there is a need for an improved transport service for communicating between distributed processes in data processing systems. The improved transport service should provide reliable communication between distributed processes including guaranteed ordering of frames transmitted between distributed processes. In addition, the improved transport service should provide for highly scalable data processing systems.

SUMMARY OF THE INVENTION

The present invention provides a distributed computer system. In one embodiment, the distributed computer system includes a source endnode including a source process which produces message data and a send work queue having work queue elements that describe the message data for sending. A destination endnode is provided including a destination process and a receive work queue having work queue elements that describe where to place incoming message data. A communication fabric is included providing communication between the source endnode and the destination endnode. An end-to-end context is provided at the source endnode and the destination endnode storing state information to ensure the reception and sequencing of message data sent from the source endnode to the destination endnode permitting reliable datagram service between the source endnode and the destination endnode.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present invention is directed to a data processing system having a reliable datagram transport service according to the present invention for providing reliable communication between distributed processes. The reliable datagram service according to the present invention also provides for a highly scalable data processing system.

Figure 1:
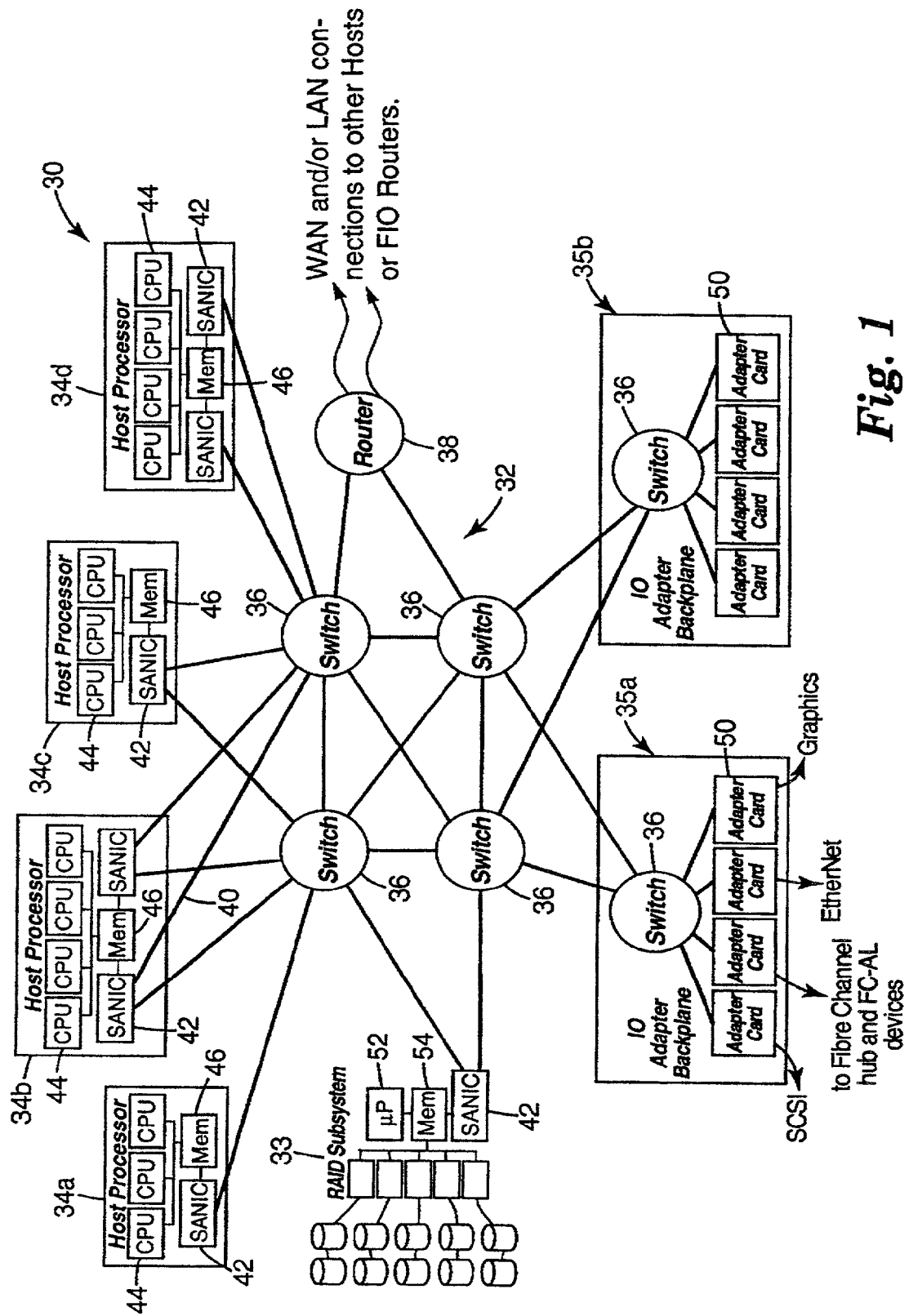
FIG. 1 is a diagram of a distributed computer system for implementing the present invention.

An example embodiment of a distributed computer system is illustrated generally at 30 in FIG. 1. Distributed computer system 30 is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

Distributed computer system 30 includes a system area network (SAN) 32 which is a high-bandwidth, low-latency network interconnecting nodes within distributed computer system 30. A node is herein defined to be any device attached to one or more links of a network and forming the origin and/or destination of messages within the network. In the example distributed computer system 30, nodes include host processors 34a–34d; redundant array independent disk (RAID) subsystem 33; and I/O adapters 35a and 35b. The nodes illustrated in FIG. 1 are for illustrative purposes only, as SAN 32 can connect any number and any type of independent processor nodes, I/O adapter nodes, and I/O device nodes. Any one of the nodes can function as an endnode, which is herein defined to be a device that originates or finally consumes messages or frames in the distributed computer system.

A message is herein defined to be an application-defined unit of data exchange, which is a primitive unit of communication between cooperating sequential processes. A frame is herein defined to be one unit of data encapsulated by a physical network protocol header and/or trailer. The header generally provides control and routing information for directing the frame through SAN 32. The trailer generally contains control and cyclic redundancy check (CRC) data for ensuring packets are not delivered with corrupted contents.

SAN 32 is the communications and management infrastructure supporting both I/O and interprocess communication (IPC) within distributed computer system 30. SAN 32 includes a switched communications fabric (SAN FABRIC) allowing many devices to concurrently transfer data with high-bandwidth and low latency in a secure, remotely managed environment. Endnodes can communicate over multiple ports and utilize multiple paths through the SAN fabric. The multiple ports and paths through SAN 32 can be employed for fault tolerance and increased bandwidth data transfers.

SAN 32 includes switches 36 and routers 38. A switch is herein defined to be a device that connects multiple links 40 together and allows routing of frames from one link 40 to another link 40 within a subnet using a small header destination ID field. A router is herein defined to be a device that connects multiple links 40 together and is capable of routing frames from one link 40 in a first subnet to another link 40 in a second subnet using a large header destination address or source address.

In one embodiment, a link 40 is a full duplex channel between any two network fabric elements, such as endnodes, switches 36, or routers 38. Example suitable links 40 include, but are not limited to, copper cables, optical cables, and printed circuit copper traces on backplanes and printed circuit boards.

Endnodes, such as host processor endnodes 34 and I/O adapter endnodes 35, generate request frames and return acknowledgment frames. By contrast, switches 36 and routers 38 do not generate and consume frames. Switches 36 and routers 38 simply pass frames along. In the case of switches 36, the frames are passed along unmodified. For routers 38, the network header is modified slightly when the frame is routed. Endnodes, switches 36, and routers 38 are collectively referred to as end stations.

In distributed computer system 30, host processor nodes 34a–34d and RAID subsystem node 33 include at least one system area network interface controller (SANIC) 42. In one embodiment, each SANIC 42 is an endpoint that implements the SAN 32 interface in sufficient detail to source or sink frames transmitted on the SAN fabric. The SANICs 42 provide an interface to the host processors and I/O devices. In one embodiment the SANIC is implemented in hardware. In this SANIC hardware implementation, the SANIC hardware offloads much of CPU and I/O adapter communication overhead. This hardware implementation of the SANIC also permits multiple concurrent communications over a switched network without the traditional overhead associated with communicating protocols. In one embodiment, SAN 32 provides the I/O and IPC clients of distributed computer system 30 zero processor-copy data transfers without involving the operating system kernel process, and employs hardware to provide reliable, fault tolerant communications.

As indicated in FIG. 1, router 38 is coupled to wide area network (WAN) and/or local area network (LAN) connections to other hosts or other routers 38.

The host processors 34a–34d include central processing units (CPUs) 44 and memory 46.

I/O adapters 35a and 35b include an I/O adapter backplane 48 and multiple I/O adapter cards 50. Example adapter cards 50 illustrated in FIG. 1 include a SCSI adapter card; an adapter card to fiber channel hub and FC-AL devices; an Ethernet adapter card; and a graphics adapter card. Any known type of adapter card can be implemented. I/O adapters 35a and 35b also include a switch 36 in the I/O adapter backplane 48 to couple the adapter cards 50 to the SAN 32 fabric.

RAID subsystem 33 includes a microprocessor 52, memory 54, read/write circuitry 56, and multiple redundant storage disks 58.

SAN 32 handles data communications for I/O and IPC in distributed computer system 30. SAN 32 supports high-bandwidth and scalability required for I/O and also supports the extremely low latency and low CPU overhead required for IPC. User clients can bypass the operating system kernel process and directly access network communication hardware, such as SANICs 42 which enable efficient message passing protocols. SAN 32 is suited to current computing models and is a building block for new forms of I/O and computer cluster communication. SAN 32 allows I/O adapter nodes to communicate among themselves or communicate with any or all of the processor nodes in distributed computer system 30. With an I/O adapter attached to SAN 32, the resulting I/O adapter node has substantially the same communication capability as any processor node in distributed computer system 30.

Channel and Memory Semantics

In one embodiment, SAN 32 supports channel semantics and memory semantics. Channel semantics is sometimes referred to as send/receive or push communication operations, and is the type of communications employed in a traditional I/O channel where a source device pushes data and a destination device determines the final destination of the data. In channel semantics, the frame transmitted from a source process specifies a destination processes' communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved with the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for I/O and IPC. A typical I/O operation employs a combination of channel and memory semantics. In an illustrative example I/O operation of distributed computer system 30, host processor 34*a* initiates an I/O operation by using channel semantics to send a disk write command to I/O adapter 35*b*. I/O adapter 35*b* examines the command and uses memory semantics to read the data buffer directly from the memory space of host processor 34*a*. After the data buffer is read, I/O adapter 35*b* employs channel semantics to push an I/O completion message back to host processor 34*a*.

In one embodiment, distributed computer system 30 performs operations that employ virtual addresses and virtual memory protection mechanisms to ensure correct and proper access to all memory. In one embodiment, applications running in distributed computed system 30 are not required to use physical addressing for any operations.

Queue Pairs

Figure 2:
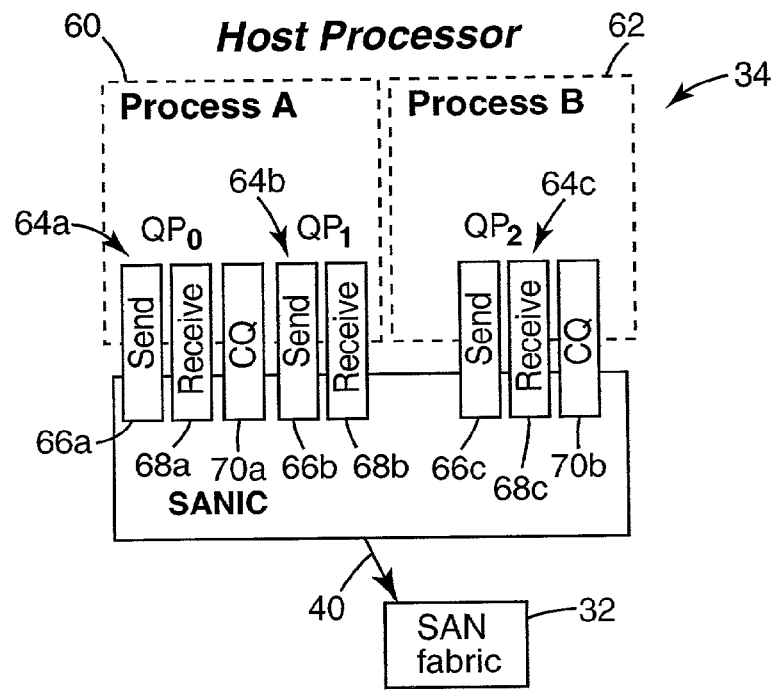
FIG. 2 is a diagram of an example host processor node for the computer system of FIG. 1.

An example host processor node 34 is generally illustrated in FIG. 2. Host processor node 34 includes a process A indicated at 60 and a process B indicated at 62. Host processor node 34 includes SANIC 42. Host processor node 34 also includes queue pairs (QPs) 64*a* and 64*b* which provide communication between process 60 and SANIC 42. Host processor node 34 also includes QP 64*c* which provides communication between process 62 and SANIC 42. A single SANIC, such as SANIC 42 in a host processor 34, can support thousands of QPs. By contrast, a SAN interface in an I/O adapter 35 typically supports less than ten QPs.

Each QP 64 includes a send work queue 66 and a receive work queue 68. A process, such as processes 60 and 62, calls an operating-system specific programming interface which is herein referred to as verbs, which place work items, referred to as work queue elements (WQEs) onto a QP 64. A WQE is executed by hardware in SANIC 42. SANIC 42 is coupled to SAN 32 via physical link 40. Send work queue 66 contains WQEs that describe data to be transmitted on the SAN 32 fabric. Receive work queue 68 contains WQEs that describe where to place incoming data from the SAN 32 fabric.

Host processor node 34 also includes completion queue 70*a* interfacing with process 60 and completion queue 70*b* interfacing with process 62. The completion queues 70 contain information about completed WQEs. The completion queues are employed to create a single point of completion notification for multiple QPs. A completion queue entry is a data structure on a completion queue 70 that describes a completed WQE. The completion queue entry contains sufficient information to determine the QP that holds the completed WQE. A completion queue context is a block of information that contains pointers to, length, and other information needed to manage the individual completion queues.

Example WQEs include work items that initiate data communications employing channel semantics or memory semantics; work items that are instructions to hardware in SANIC 42 to set or alter remote memory access protections; and work items to delay the execution of subsequent WQEs posted in the same send work queue 66.

More specifically, example WQEs supported for send work queues 66 are as follows. A send buffer WQE is a channel semantic operation to push a local buffer to a remote QPs receive buffer. The send buffer WQE includes a gather list to combine several virtual contiguous local buffers into a single message that is pushed to a remote QPs receive buffer. The local buffer virtual addresses are in the address space of the process that created the local QP.

A remote direct memory access (RDMA) read WQE provides a memory semantic operation to read a virtually contiguous buffer on a remote node. The RDMA read WQE reads a virtually contiguous buffer on a remote endnode and writes the data to a virtually contiguous local memory buffer. Similar to the send buffer WQE, the local buffer for the RDMA read WQE is in the address space of the process that created the local QP. The remote buffer is in the virtual address space of the process owning the remote QP targeted by the RDMA read WQE.

A RDMA write WQE provides a memory semantic operation to write a virtually contiguous buffer on a remote node. The RDMA write WQE contains a scatter list of locally virtually contiguous buffers and the virtual address of the remote buffer into which the local buffers are written.

A RDMA FetchOp WQE provides a memory semantic operation to perform an atomic operation on a remote word. The RDMA FetchOp WQE is a combined RDMA read, modify, and RDMA write operation. The RDMA FetchOp WQE can support several read-modify-write operations, such as Compare and Swap if equal.

A bind/unbind remote access key (RKey) WQE provides a command to SANIC hardware to modify the association of a RKey with a local virtually contiguous buffer. The RKey is part of each RDMA access and is used to validate that the remote process has permitted access to the buffer.

A delay WQE provides a command to SANIC hardware to delay processing of the QPs WQEs for a specific time interval. The delay WQE permits a process to meter the flow of operations into the SAN fabric.

In one embodiment, receive queues 68 only support one type of WQE, which is referred to as a receive buffer WQE. The receive buffer WQE provides a channel semantic operation describing a local buffer into which incoming send messages are written. The receive buffer WQE includes a scatter list describing several virtually contiguous local buffers. An incoming send message is written to these buffers. The buffer virtual addresses are in the address space of the process that created the local QP.

For IPC, a user-mode software process transfers data through QPs 64 directly from where the buffer resides in memory. In one embodiment, the transfer through the QPs bypasses the operating system and consumes few host instruction cycles. QPs 64 permit zero processor-copy data transfer with no operating system kernel involvement. The zero processor-copy data transfer provides for efficient support of high-bandwidth and low-latency communication.

Transport Services

When a QP 64 is created, the QP is set to provide a selected type of transport service. In one embodiment, a distributed computer system implementing the present invention supports four types of transport services.

Figure 3:
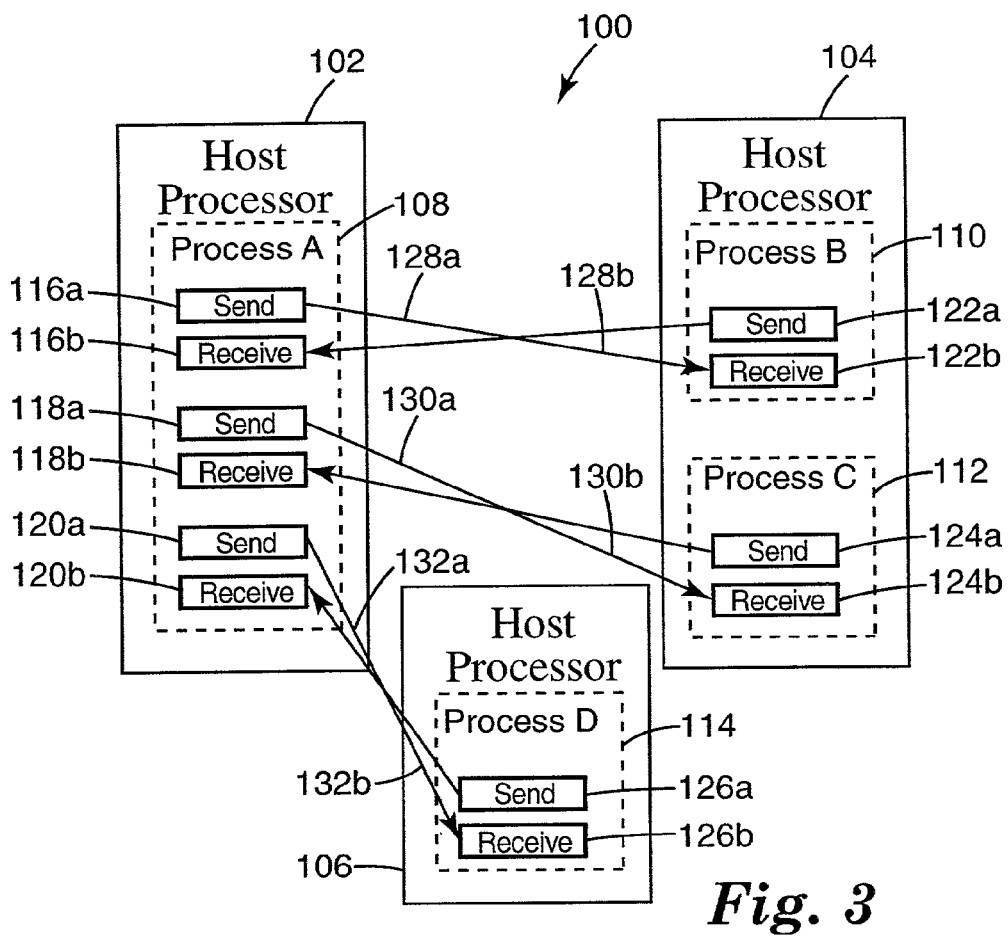
FIG. 3 is a diagram of a portion of a distributed computer system employing a reliable connection service to communicate between distributed processes.

A portion of a distributed computer system employing a reliable connection service to communicate between distributed processes is illustrated generally at 100 in FIG. 3. Distributed computer system 100 includes a host processor node 102, a host processor node 104, and a host processor node 106. Host processor node 102 includes a process A indicated at 108. Host processor node 104 includes a process B indicated at 110 and a process C indicated at 112. Host processor node 106 includes a process D indicated at 114.

Host processor node 102 includes a QP 116 having a send work queue 116*a* and a receive work queue 116*b*; a QP 118 having a send work queue 118*a* and receive work queue 118*b*; and a QP 120 having a send work queue 120*a* and a receive work queue 120*b* which facilitate communication to and from process A indicated at 108. Host processor node 104 includes a QP 122 having a send work queue 122*a* and receive work queue 122*b* for facilitating communication to and from process B indicated at 110. Host processor node 104 includes a QP 124 having a send work queue 124*a* and receive work queue 124*b* for facilitating communication to and from process C indicated at 112. Host processor node 106 includes a QP 126 having a send work queue 126*a* and receive work queue 126*b* for facilitating communication to and from process D indicated at 114.

The reliable connection service of distributed computer system 100 associates a local QP with one and only one remote QP. Thus, QP 116 is connected to QP 122 via a non-sharable resource connection 128 having a non-sharable resource connection 128*a* from send work queue 116*a* to receive work queue 122*b* and a non-sharable resource connection 128*b* from send work queue 122*a* to receive work queue 116*b*. QP 118 is connected to QP 124 via a non-sharable resource connection 130 having a non-sharable resource connection 130*a* from send work queue 118*a* to receive work queue 124*b* and a non-sharable resource connection 130*b* from send work queue 124*a* to receive work queue 118*b*. QP 120 is connected to QP 126 via a non-sharable resource connection 132 having a non-sharable resource connection 132*a* from send work queue 120*a* to receive work queue 126*b* and a non-sharable resource connection 132*b* from send work queue 126*a* to receive work queue 120*b*.

A send buffer WQE placed on one QP in a reliable connection service causes data to be written into the receive buffer of the connected QP. RDMA operations operate on the address space of the connected QP.

The reliable connection service requires a process to create a QP for each process which is to communicate with over the SAN fabric. Thus, if each of N host processor nodes contain M processes, and all M processes on each node wish to communicate with all the processes on all the other nodes, each host processor node requires $M^2 \times (N-1)$ QPs. Moreover, a process can connect a QP to another QP on the same SANIC.

In one embodiment, the reliable connection service is made reliable because hardware maintains sequence numbers and acknowledges all frame transfers. A combination of hardware and SAN driver software retries any failed communications. The process client of the QP obtains reliable communications even in the presence of bit errors, receive buffer underruns, and network congestion. If alternative paths exist in the SAN fabric, reliable communications can be maintained even in the presence of failures of fabric switches or links.

In one embodiment, acknowledgements are employed to deliver data reliably across the SAN fabric. In one embodiment, the acknowledgement is not a process level acknowledgment, because the acknowledgment does not validate the receiving process has consumed the data. Rather, the acknowledgment only indicates that the data has reached its destination.

Figure 4:
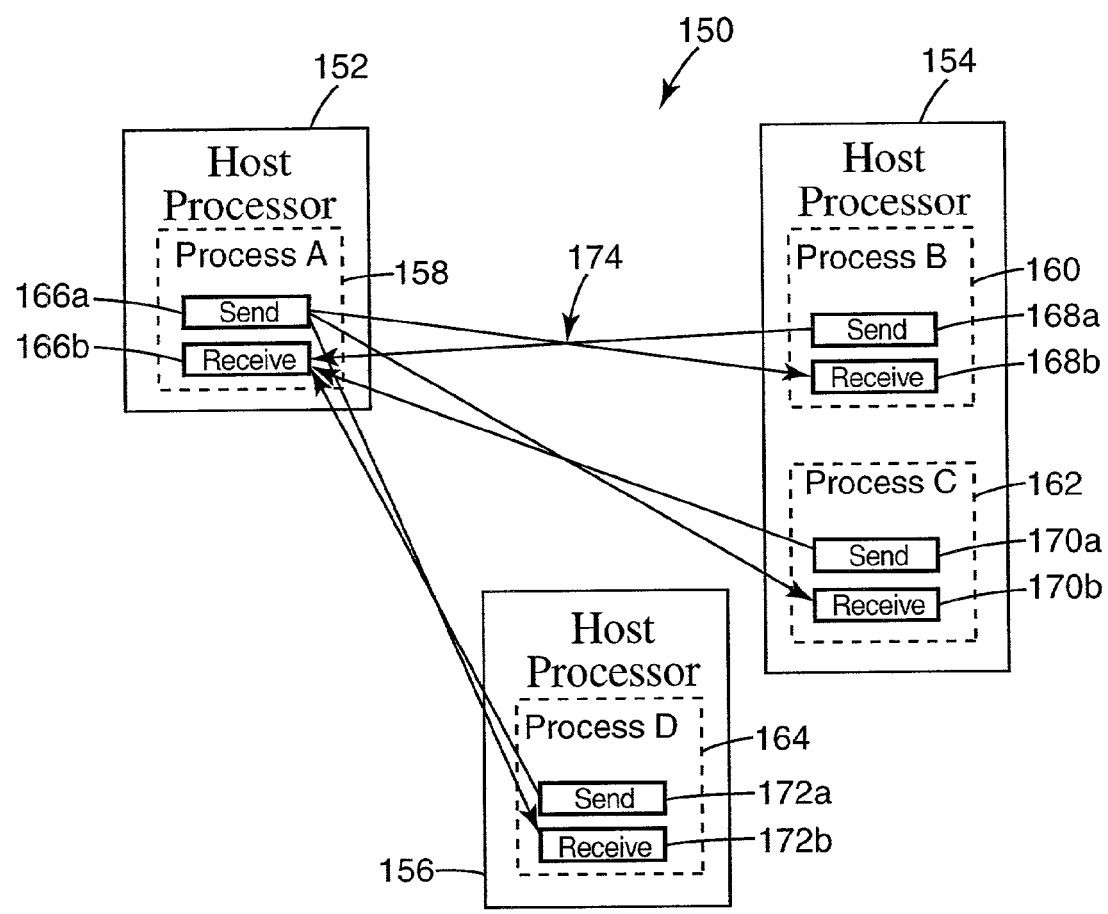
FIG. 4 is a diagram of a portion of distributed computer system employing a reliable datagram service to communicate between distributed processes.

A portion of a distributed computer system employing a reliable datagram service to communicate between distributed processes is illustrated generally at 150 in FIG. 4. Distributed computer system 150 includes a host processor node 152, a host processor node 154, and a host processor node 156. Host processor node 152 includes a process A indicated at 158. Host processor node 154 includes a process B indicated at 160 and a process C indicated at 162. Host processor node 156 includes a process D indicated at 164.

Host processor node 152 includes QP 166 having send work queue 166*a* and receive work queue 166*b* for facilitating communication to and from process A indicated at 158. Host processor node 154 includes QP 168 having send work queue 168*a* and receive work queue 168*b* for facilitating communication from and to process B indicated at 160. Host processor node 154 includes QP 170 having send work queue 170*a* and receive work queue 170*b* for facilitating communication from and to process C indicated at 162. Host processor node 156 includes QP 172 having send work queue 172*a* and receive work queue 172*b* for facilitating communication from and to process D indicated at 164. In the reliable datagram service implemented in distributed computer system 150, the QPs are coupled in what is referred to as a connectionless transport service.

For example, a reliable datagram service 174 couples QP 166 to QPs 168, 170, and 172. Specifically, reliable datagram service 174 couples send work queue 166*a* to receive work queues 168*b*, 170*b*, and 172*b*. Reliable datagram service 174 also couples send work queues 168*a*, 170*a*, and 172*a* to receive work queue 166*b*.

The reliable datagram service permits a client process of one QP to communicate with any other QP on any other remote node. At a receive work queue, the reliable datagram service permits incoming messages from any send work queue on any other remote node.

In one embodiment, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless QPs communicating between a pair of endnodes. Each endnode requires at least one EE context for every endnode it wishes to communicate with in the reliable datagram service (e.g., a given endnode requires at least N EE contexts to be able to have reliable datagram service with N other endnodes).

The reliable datagram service greatly improves scalability because the reliable datagram service is connectionless. Therefore, an endnode with a fixed number of QPs can communicate with far more processes and endnodes with a reliable datagram service than with a reliable connection transport service. For example, if each of N host processor nodes contain M processes, and all M processes on each node wish to communicate with all the processes on all the other nodes, the reliable connection service requires $M^2 \times (N-1)$ QPs on each node. By comparison, the connectionless reliable datagram service only requires M QPs+(N-1) EE contexts on each node for exactly the same communications.

A third type of transport service for providing communications is a unreliable datagram service. Similar to the reliable datagram service, the unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

A fourth type of transport service is referred to as raw datagram service and is technically not a transport service. The raw datagram service permits a QP to send and to receive raw datagram frames. The raw datagram mode of operation of a QP is entirely controlled by software. The raw datagram mode of the QP is primarily intended to allow easy interfacing with traditional internet protocol, version 6 (IPv6) LAN-WAN networks, and further allows the SANIC to be used with full software protocol stacks to access transmission control protocol (TCP), user datagram protocol (UDP), and other standard communication protocols. Essentially, in the raw datagram service, SANIC hardware generates and consumes standard protocols layered on top of IPv6, such as TCP and UDP. The frame header can be mapped directly to and from an IPv6 header. Native IPv6 frames can be bridged into the SAN fabric and delivered directly to a QP to allow a client process to support any transport protocol running on top of IPv6. A client process can register with SANIC hardware in order to direct datagrams for a particular upper level protocol (e.g., TCP and UDP) to a particular QP. SANIC hardware can demultiplex incoming IPv6 streams of datagrams based on a next header field as well as the destination IP address.

SANIC and I/O Adapter Endnodes

Figure 5:
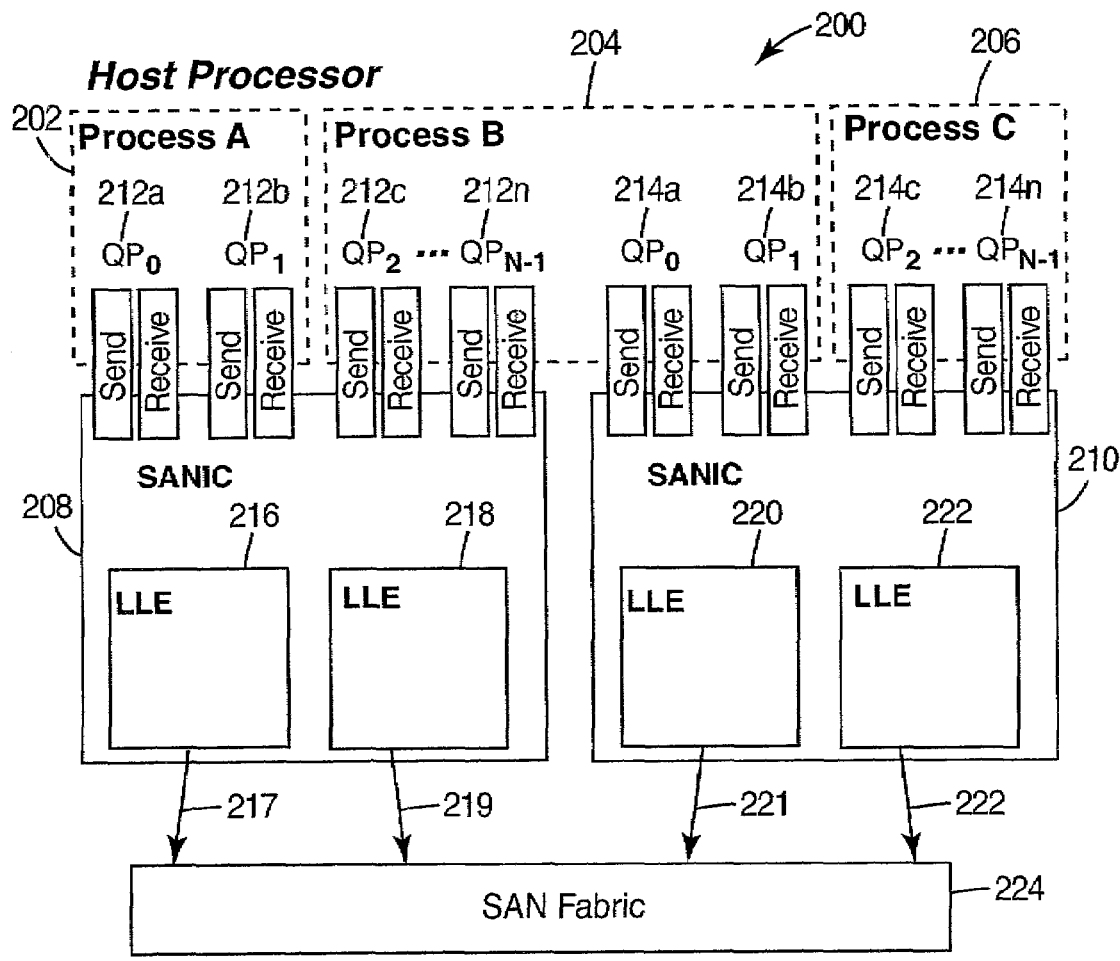
FIG. 5 is a diagram of an example host processor node for operation in a distributed computer system implementing the present invention.

An example host processor node is generally illustrated at 200 in FIG. 5. Host processor node 200 includes a process A indicated at 202, a process B indicated at 204, and a process C indicated at 206. Host processor 200 includes a SANIC 208 and a SANIC 210. As discussed above, a host processor endnode or an I/O adapter endnode can have one or more SANICs. SANIC 208 includes a SAN link level engine (LLE) 216 for communicating with SAN fabric 224 via link 217 and an LLE 218 for communicating with SAN fabric 224 via link 219. SANIC 210 includes an LLE 220 for communicating with SAN fabric 224 via link 221 and an LLE 222 for communicating with SAN fabric 224 via link 223. SANIC 208 communicates with process A indicated at 202 via QPs 212a and 212b. SANIC 208 communicates with process B indicated at 204 via QPs 212c–212n. Thus, SANIC 208 includes N QPs for communicating with processes A and B. SANIC 210 includes QPs 214a and 214b for communicating with process B indicated at 204. SANIC 210 includes QPs 214c–214n for communicating with process C indicated at 206. Thus, SANIC 210 includes N QPs for communicating with processes B and C.

An LLE runs link level protocols to couple a given SANIC to the SAN fabric. RDMA traffic generated by a SANIC can simultaneously employ multiple LLEs within the SANIC which permits striping across LLEs. Striping refers to the dynamic sending of frames within a single message to an endnode's QP through multiple fabric paths. Striping across LLEs increases the bandwidth for a single QP as well as provides multiple fault tolerant paths. Striping also decreases the latency for message transfers. In one embodiment, multiple LLEs in a SANIC are not visible to the client process generating message requests. When a host processor includes multiple SANICs, the client process must explicitly move data on the two SANICs in order to gain parallelism. A single QP cannot be shared by SANICS. Instead a QP is owned by one local SANIC.

The following is an example naming scheme for naming and identifying endnodes in one embodiment of a distributed computer system according to the present invention. A host name provides a logical identification for a host node, such as a host processor node or I/O adapter node. The host name identifies the endpoint for messages such that messages are destine for processes residing on an endnode specified by the host name. Thus, there is one host name per node, but a node can have multiple SANICs.

A globally unique ID (GUID) identifies a transport endpoint. A transport endpoint is the device supporting the transport QPs. There is one GUID associated with each SANIC.

A local ID refers to a short address ID used to identify a SANIC within a single subnet. In one example embodiment, a subnet has up $2^{16}$ endnodes, switches, and routers, and the local ID (LID) is accordingly 16 bits. A source LID (SLID) and a destination LID (DLID) are the source and destination LIDs used in a local network header. A LLE has a single LID associated with the LLE, and the LID is only unique within a given subnet. One or more LIDs can be associated with each SANIC.

An internet protocol (IP) address (e.g., a 128 bit IPv6 ID) addresses a SANIC. The SANIC, however, can have one or more IP addresses associated with the SANIC. The IP address is used in the global network header when routing frames outside of a given subnet. LIDs and IP addresses are network endpoints and are the target of frames routed through the SAN fabric. All IP addresses (e.g., IPv6 addresses) within a subnet share a common set of high order address bits.

In one embodiment, the LLE is not named and is not architecturally visible to a client process. In this embodiment, management software refers to LLEs as an enumerated subset of the SANIC.

Switches and Routers

Figure 6:
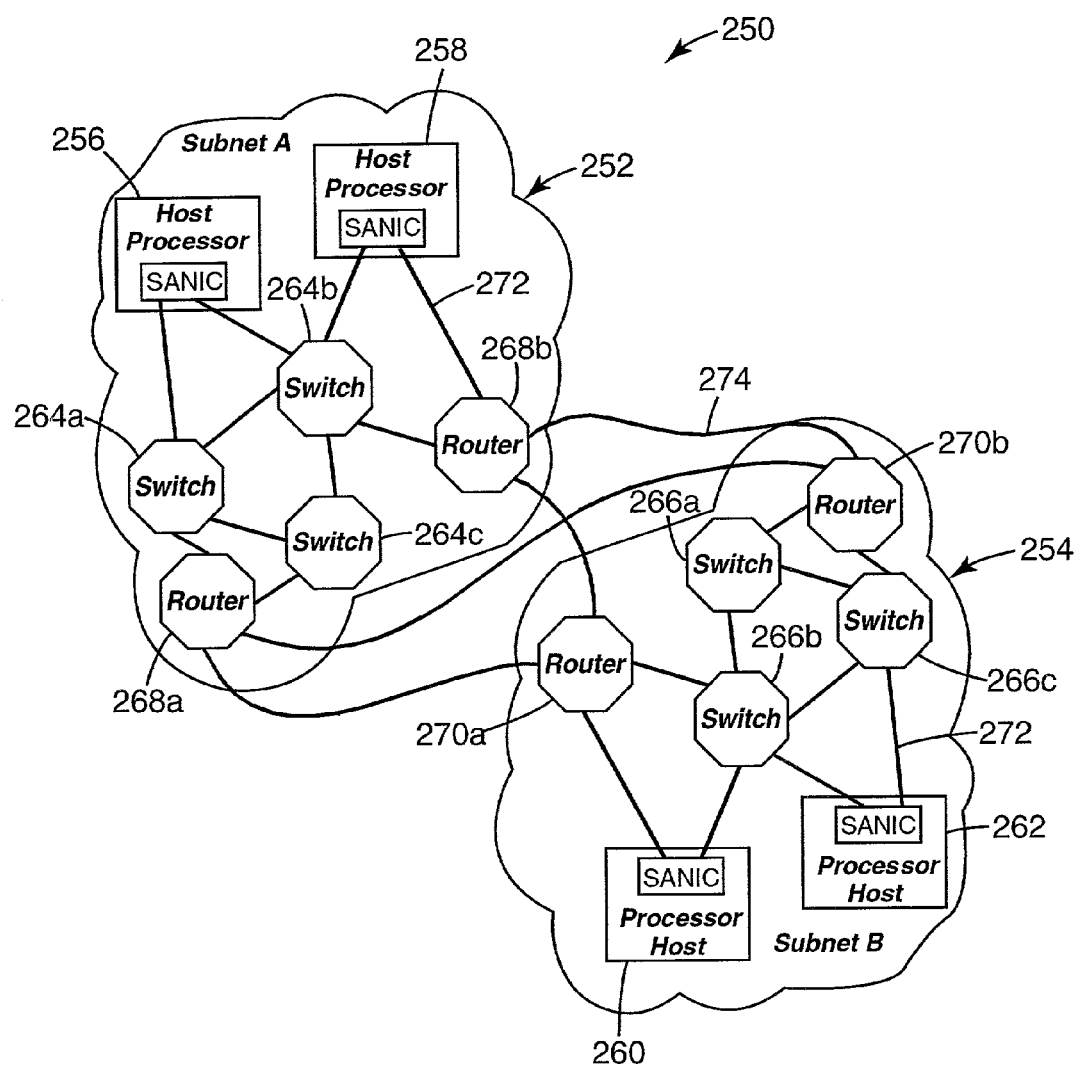
FIG. 6 is a diagram of a portion of a distributed computer system illustrating subnets in the distributed computer system.

A portion of a distributed computer system is generally illustrated at 250 in FIG. 6. Distributed computer system 250 includes a subnet A indicated at 252 and a subnet B indicated at 254. Subnet A indicated at 252 includes a host processor node 256 and a host processor node 258. Subnet B indicated at 254 includes a host processor node 260 and host processor node 262. Subnet A indicated at 252 includes switches 264a–264c. Subnet B indicated at 254 includes switches 266a–266c. Each subnet within distributed computer system 250 is connected to other subnets with routers. For example, subnet A indicated at 252 includes routers 268a and 268b which are coupled to routers 270a and 270b of subnet B indicated at 254. In one example embodiment, a subnet has up to $2^{16}$ endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast worm-hole or cut-through routing for messages.

A switch within a subnet examines the DLID that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 6, for expansion to much larger systems, subnets are connected with routers, such as routers 268 and 270. The router interprets the IP destination ID (e.g., IPv6 destination ID) and routes the IP like frame.

In one embodiment, switches and routers degrade when links are over utilized. In this embodiment, link level back pressure is used to temporarily slow the flow of data when multiple input frames compete for a common output. However, link or buffer contention does not cause loss of data. In one embodiment, switches, routers, and endnodes employ a link protocol to transfer data. In one embodiment, the link protocol supports an automatic error retry. In this example embodiment, link level acknowledgments detect errors and force retransmission of any data impacted by bit errors. Link-level error recovery greatly reduces the number of data errors that are handled by the end-to-end protocols. In one embodiment, the user client process is not involved with error recovery no matter if the error is detected and corrected by the link level protocol or the end-to-end protocol.

Figure 7:
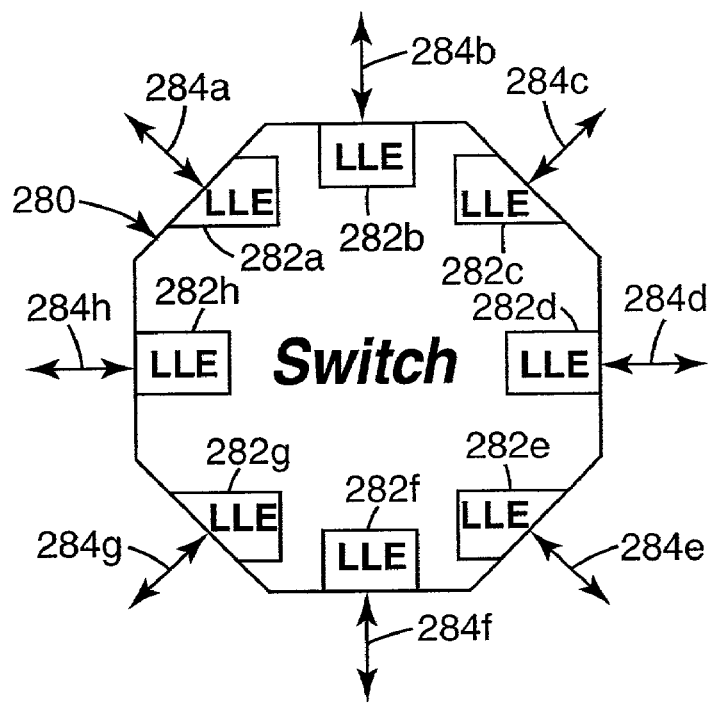
FIG. 7 is a diagram of a switch for use in a distributed computer system implemented the present invention.

An example embodiment of a switch is generally illustrated at 280 in FIG. 7. Each I/O path on a switch or router has an LLE. For example, switch 280 includes LLEs 282a–282h for communicating respectively with links 284a–284h.

The naming scheme for switches and routers is similar to the above-described naming scheme for endnodes. The following is an example switch and router naming scheme for identifying switches and routers in the SAN fabric. A switch name identifies each switch or group of switches packaged and managed together. Thus, there is a single switch name for each switch or group of switches packaged and managed together.

Each switch or router element has a single unique GUID. Each switch has one or more LIDs and IP addresses (e.g., IPv6 addresses) that are used as an endnode for management frames.

Each LLE is not given an explicit external name in the switch or router. Since links are point-to-point, the other end of the link does not need to address the LLE.

Virtual Lanes

Switches and routers employ multiple virtual lanes within a single physical link. As illustrated in FIG. 6, physical links 272 connect endnodes, switches, and routers within a subnet. WAN or LAN connections 274 typically couple routers between subnets. Frames injected into the SAN fabric follow a particular virtual lane from the frame's source to the frame's destination. At any one time, only one virtual lane makes progress on a given physical link. Virtual lanes provide a technique for applying link level flow control to one virtual lane without affecting the other virtual lanes. When a frame on one virtual lane blocks due to contention, quality of service (QoS), or other considerations, a frame on a different virtual lane is allowed to make progress.

Virtual lanes are employed for numerous reasons, some of which are as follows. Virtual lanes provide QoS. In one example embodiment, certain virtual lanes are reserved for high priority or isonchronous traffic to provide QoS.

Virtual lanes provide deadlock avoidance. Virtual lanes allow topologies that contain loops to send frames across all physical links and still be assured the loops won't cause back pressure dependencies that might result in deadlock.

Virtual lanes alleviate head-of-line blocking. With virtual lanes, a blocked frames can pass a temporarily stalled frame that is destined for a different final destination.

In one embodiment, each switch includes its own crossbar switch. In this embodiment, a switch propagates data from only one frame at a time, per virtual lane through its crossbar switch. In another words, on any one virtual lane, a switch propagates a single frame from start to finish. Thus, in this embodiment, frames are not multiplexed together on a single virtual lane.

Paths in SAN fabric

Referring to FIG. 6, within a subnet, such as subnet A indicated at 252 or subnet B indicated at 254, a path from a source port to a destination port is determined by the LID of the destination SANIC port. Between subnets, a path is determined by the IP address (e.g., IPv6 address) of the destination SANIC port.

In one embodiment, the paths used by the request frame and the request frame's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria is contained in one routing table. In an alternative embodiment, a switch employs a separate set of criteria for each input port.

Each port on an endnode can have multiple IP addresses. Multiple IP addresses can be used for several reasons, some of which are provided by the following examples. In one embodiment, different IP addresses identify different partitions or services on an endnode. In one embodiment, different IP addresses are used to specify different QoS attributes. In one embodiment, different IP addresses identify different paths through intra-subnet routes.

In one embodiment, each port on an endnode can have multiple LIDs. Multiple LIDs can be used for several reasons some of which are provided by the following examples. In one embodiment, different LIDs identify different partitions or services on an endnode. In one embodiment, different LIDs are used to specify different QoS attributes. In one embodiment, different LIDs specify different paths through the subnet.

A one-to-one correspondence does not necessarily exist between LIDs and IP addresses, because a SANIC can have more or less LIDs than IP addresses for each port. For SANICs with redundant ports and redundant conductivity to multiple SAN fabrics, SANICs can, but are not required to, use the same LID and IP address on each of its ports.

Data Transactions

Referring to FIG. 1, a data transaction in distributed computer system 30 is typically composed of several hardware and software steps. A client process of a data transport service can be a user-mode or a kernel-mode process. The client process accesses SANIC 42 hardware through one or more QPs, such as QPs 64 illustrated in FIG. 2. The client process calls an operating-system specific programming interface which is herein referred to as verbs. The software code implementing the verbs intern posts a WQE to the given QP work queue.

There are many possible methods of posting a WQE and there are many possible WQE formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, SANIC hardware detects WQE posting and accesses the WQE. In this embodiment, the SANIC hardware translates and validates the WQEs virtual addresses and accesses the data. In one embodiment, an outgoing message buffer is split into one or more frames. In one embodiment, the SANIC hardware adds a transport header and a network header to each frame. The transport header includes sequence numbers and other transport information. The network header includes the destination IP address or the DLID or other suitable destination address information. The appropriate local or global network header is added to a given frame depending on if the destination endnode resides on the local subnet or on a remote subnet.

A frame is a unit of information that is routed through the SAN fabric. The frame is an endnode-to-endnode construct, and is thus created and consumed by endnodes. Switches and routers neither generate nor consume request frames or acknowledgment frames. Instead switches and routers simply move request frames or acknowledgment frames closer to the ultimate destination. Routers, however, modify the frame's network header when the frame crosses a subnet boundary. In traversing a subnet, a single frame stays on a single virtual lane.

When a frame is placed onto a link, the frame is further broken down into flits. A flit is herein defined to be a unit of link-level flow control and is a unit of transfer employed only on a point-to-point link. The flow of flits is subject to the link-level protocol which can perform flow control or retransmission after an error. Thus, flit is a link-level construct that is created at each endnode, switch, or router output port and consumed at each input port. In one embodiment, a flit contains a header with virtual lane error checking information, size information, and reverse channel credit information.

If a reliable transport service is employed, after a request frame reaches its destination endnode, the destination endnode sends an acknowledgment frame back to the sender endnode. The acknowledgment frame permits the requestor to validate that the request frame reached the destination endnode. An acknowledgment frame is sent back to the requestor after each request frame. The requestor can have multiple outstanding requests before it receives any acknowledgments. In one embodiment, the number of multiple outstanding requests is determined when a QP is created.

Example Request and Acknowledgment Transactions

Figure 8:
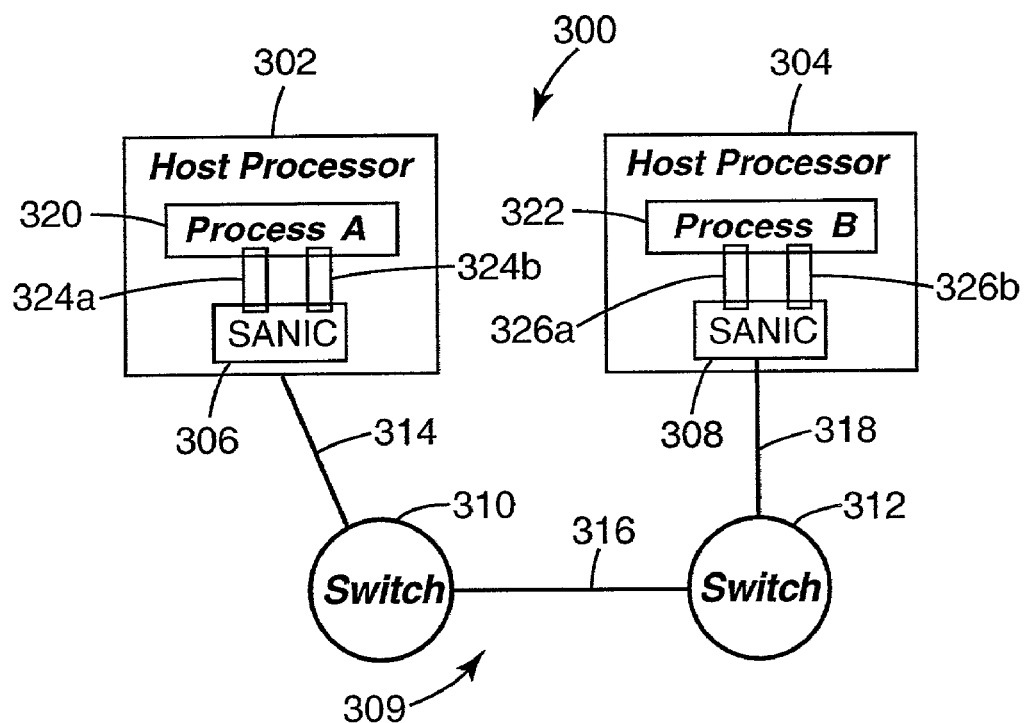
FIG. 8 is a diagram of a portion of a distributed computer system.

FIGS. 8, 9A, 9B, 10A, and 10B together illustrate example request and acknowledgment transactions. In FIG. 8, a portion of a distributed computer system is generally illustrated at 300. Distributed computer system 300 includes a host processor node 302 and a host processor node 304. Host processor node 302 includes a SANIC 306. Host processor node 304 includes a SANIC 308. Distributed computer system 300 includes a SAN fabric 309 which includes a switch 310 and a switch 312. SAN fabric 309 includes a link 314 coupling SANIC 306 to switch 310; a link 316 coupling switch 310 to switch 312; and a link 318 coupling SANIC 308 to switch 312.

In the example transactions, host processor node 302 includes a client process A indicated at 320. Host processor node 304 includes a client process B indicated at 322. Client process 320 interacts with SANIC hardware 306 through QP 324. Client process 322 interacts with SANIC hardware 308 through QP 326. QP 324 and 326 are software data structures. QP 324 includes send work queue 324a and receive work queue 324b. QP 326 includes send work queue 326a and receive work queue 326b.

Process 320 initiates a message request by posting WQEs to send queue 324a. Such a WQE is illustrated at 330 in FIG. 9A. The message request of client process 320 is referenced by a gather list 332 contained in send WQE 330. Each entry in gather list 332 points to a virtually contiguous buffer in the local memory space containing a part of the message, such as indicated by virtual contiguous buffers 334a–334d, which respectively hold message 0, parts 0, 1, 2, and 3.

Figure 9A:
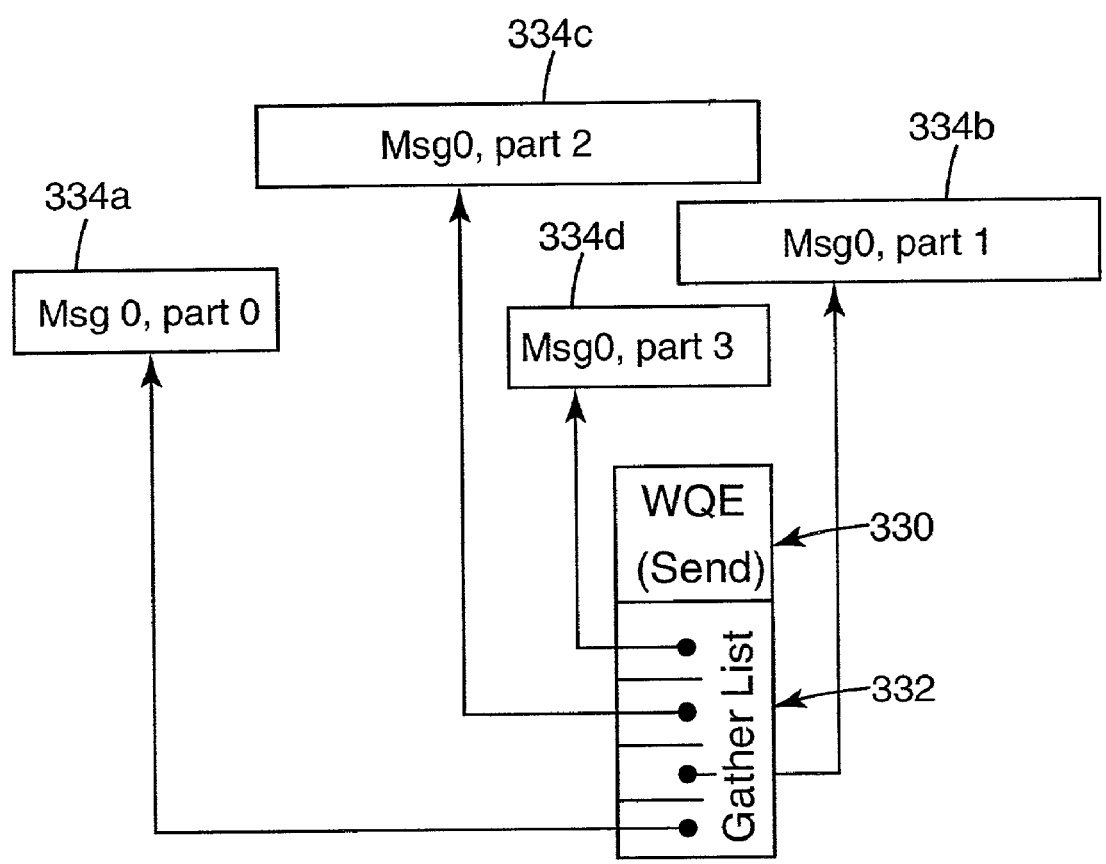
FIG. 9A is a diagram of a work queue element (WQE) for operation in the distributed computer system of FIG. 8.
Figure 9B:
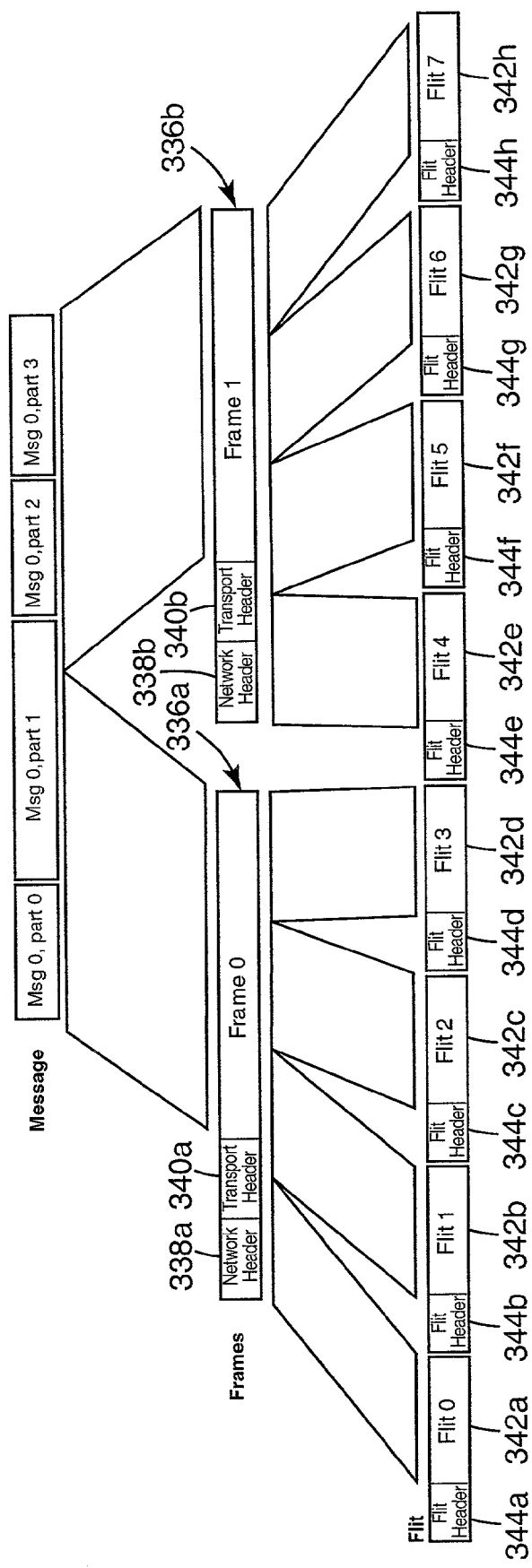
FIG. 9B is a diagram of the packetization process of a message created by the WQE of FIG. 9A into frames and flits.

Referring to FIG. 9B, hardware in SANIC 306 reads WQE 330 and packetizes the message stored in virtual contiguous buffers 334a–334d into frames and flits. As illustrated in FIG. 9B, all of message 0, part 0 and a portion of message 0, part 1 are packetized into frame 0, indicated at 336a. The rest of message 0, part 1 and all of message 0, part 2, and all of message 0, part 3 are packetized into frame 1, indicated at 336b. Frame 0 indicated at 336a includes network header 338a and transport header 340a. Frame 1 indicated at 336b includes network header 338b and transport header 340b.

As indicated in FIG. 9B, frame 0 indicated at 336a is partitioned into flits 0–3, indicated respectively at 342a–342d. Frame 1 indicated at 336b is partitioned into flits 4–7 indicated respectively at 342e–342h. Flits 342a through 342h respectively include flit headers 344a–344h.

Frames are routed through the SAN fabric, and for reliable transfer services, are acknowledged by the final destination endnode. If not successively acknowledged, the frame is retransmitted by the source endnode. Frames are generated by source endnodes and consumed by destination endnodes. The switches and routers in the SAN fabric neither generate nor consume frames.

Flits are the smallest unit of flow control in the network. Flits are generated and consumed at each end of a physical link. Flits are acknowledged at the receiving end of each link and are retransmitted in response to an error.

Figure 10A:
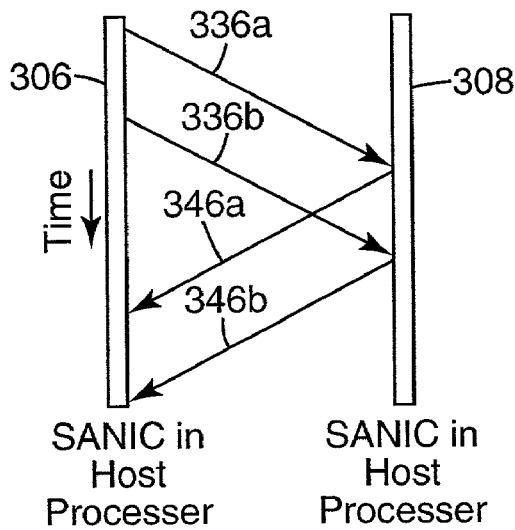
FIG. 10A is a diagram of a message being transmitted with a reliable transport service illustrating frame transactions.

Referring to FIG. 10A, the send request message 0 is transmitted from SANIC 306 in host processor node 302 to SANIC 308 in host processor node 304 as frames 0 indicated at 336a and frame 1 indicated at 336b. ACK frames 346a and 346b, corresponding respectively to request frames 336a and 336b, are transmitted from SANIC 308 in host processor node 304 to SANIC 306 in host processor node 302.

In FIG. 10A, message 0 is being transmitted with a reliable transport service. Each request frame is individually acknowledged by the destination endnode (e.g., SANIC 308 in host processor node 304).

Figure 10B:
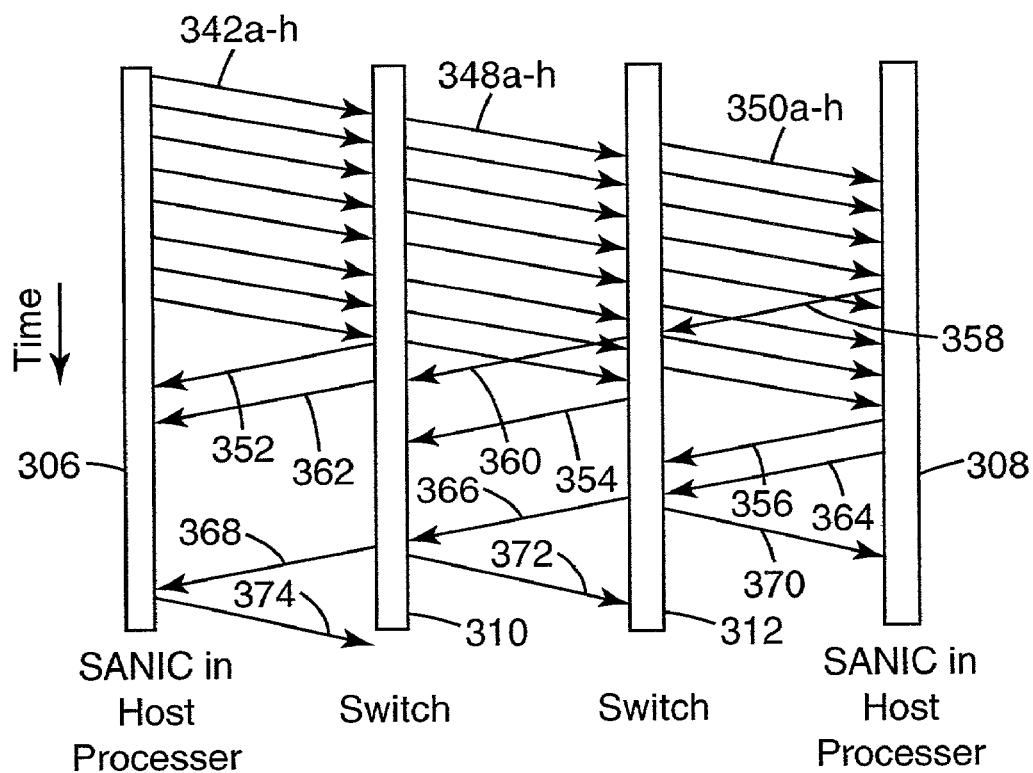
FIG. 10B is a diagram illustrating a reliable transport service illustrating flit transactions associated with the frame transactions of FIG. 10A.

FIG. 10B illustrates the flits associated with the request frames 336 and acknowledgment frames 346 illustrated in FIG. 10A passing between the host processor endnodes 302 and 304 and the switches 310 and 312. As illustrated in FIG. 10B, an ACK frame fits inside one flit. In one embodiment, one acknowledgment flit acknowledges several flits.

As illustrated in FIG. 10B, flits 342a–h are transmitted from SANIC 306 to switch 310. Switch 310 consumes flits 342a–h at its input port, creates flits 348a–h at its output port corresponding to flits 342a–h, and transmits flits 348a–h to switch 312. Switch 312 consumes flits 348a–h at its input port, creates flits 350*a–h* at its output port corresponding to flits 348*a–h*, and transmits flits 350*a–h* to SANIC 308. SANIC 308 consumes flits 350*a–h* at its input port. An acknowledgment flit is transmitted from switch 310 to SANIC 306 to acknowledge the receipt of flits 342*a–h*. An acknowledgment flit 354 is transmitted from switch 312 to switch 310 to acknowledge the receipt of flits 348*a–h*. An acknowledgment flit 356 is transmitted from SANIC 308 to switch 312 to acknowledge the receipt of flits 350*a–h*.

Acknowledgment frame 346*a* fits inside of flit 358 which is transmitted from SANIC 308 to switch 312. Switch 312 consumes flits 358 at its input port, creates flit 360 corresponding to flit 358 at its output port, and transmits flit 360 to switch 310. Switch 310 consumes flit 360 at its input port, creates flit 362 corresponding to flit 360 at its output port, and transmits flit 362 to SANIC 306. SANIC 306 consumes flit 362 at its input port. Similarly, SANIC 308 transmits acknowledgment frame 346*b* in flit 364 to switch 312. Switch 312 creates flit 366 corresponding to flit 364, and transmits flit 366 to switch 310. Switch 310 creates flit 368 corresponding to flit 366, and transmits flit 368 to SANIC 306.

Switch 312 acknowledges the receipt of flits 358 and 364 with acknowledgment flit 370, which is transmitted from switch 312 to SANIC 308. Switch 310 acknowledges the receipt of flits 360 and 366 with acknowledgment flit 372, which is transmitted to switch 312. SANIC 306 acknowledges the receipt of flits 362 and 368 with acknowledgment flit 374 which is transmitted to switch 310.

Architecture Layers and Implementation Overview

A host processor endnode and an I/O adapter endnode typically have quite different capabilities. For example, an example host processor endnode might support four ports, hundreds to thousands of QPs, and allow incoming RDMA operations, while an attached I/O adapter endnode might only support one or two ports, tens of QPs, and not allow incoming RDMA operations. A low-end attached I/O adapter alternatively can employ software to handle much of the network and transport layer functionality which is performed in hardware (e.g., by SANIC hardware) at the host processor endnode.

Figure 11:
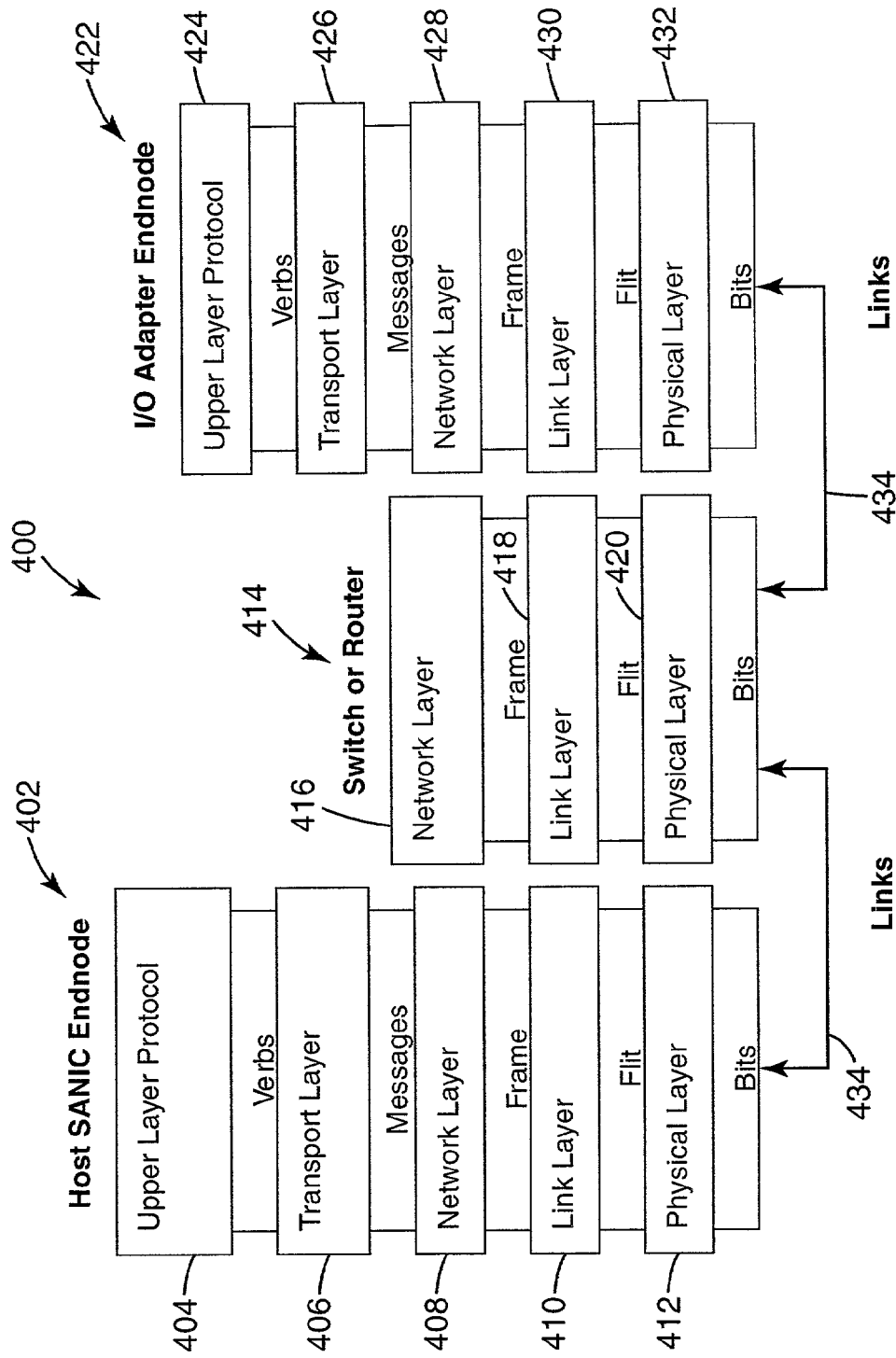
FIG. 11 is a diagram of a layered architecture for implementing the present invention.

One embodiment of a layered architecture for implementing the present invention is generally illustrated at 400 in diagram form in FIG. 11. The layered architecture diagram of FIG. 11 shows the various layers of data communication paths, and organization of data and control information passed between layers.

Host SANIC endnode layers are generally indicated at 402. The host SANIC endnode layers 402 include an upper layer protocol 404; a transport layer 406; a network layer 408; a link layer 410; and a physical layer 412.

Switch or router layers are generally indicated at 414. Switch or router layers 414 include a network layer 416; a link layer 418; and a physical layer 420.

I/O adapter endnode layers are generally indicated at 422. I/O adapter endnode layers 422 include an upper layer protocol 424; a transport layer 426; a network layer 428; a link layer 430; and a physical layer 432.

The layered architecture 400 generally follows an outline of a classical communication stack. The upper layer protocols employ verbs to create messages at the transport layers. The transport layers pass messages to the network layers. The network layers pass frames down to the link layers. The link layers pass flits through physical layers. The physical layers send bits or groups of bits to other physical layers. Similarly, the link layers pass flits to other link layers, and don't have visibility to how the physical layer bit transmission is actually accomplished. The network layers only handle frame routing, without visibility to segmentation and reassembly of frames into flits or transmission between link layers.

Bits or groups of bits are passed between physical layers via links 434. Links 434 can be implemented with printed circuit copper traces, copper cable, optical cable, or with other suitable links.

The upper layer protocol layers are applications or processes which employ the other layers for communicating between endnodes.

The transport layers provide end-to-end message movement. In one embodiment, the transport layers provide four types of transport services as described above which are reliable connection service; reliable datagram service; unreliable datagram service; and raw datagram service.

The network layers perform frame routing through a subnet or multiple subnets to destination endnodes.

The link layers perform flow-controlled, error controlled, and prioritized frame delivery across links.

The physical layers perform technology-dependent bit transmission and reassembly into flits.

Reliable Datagram Transport Service

Figure 12:
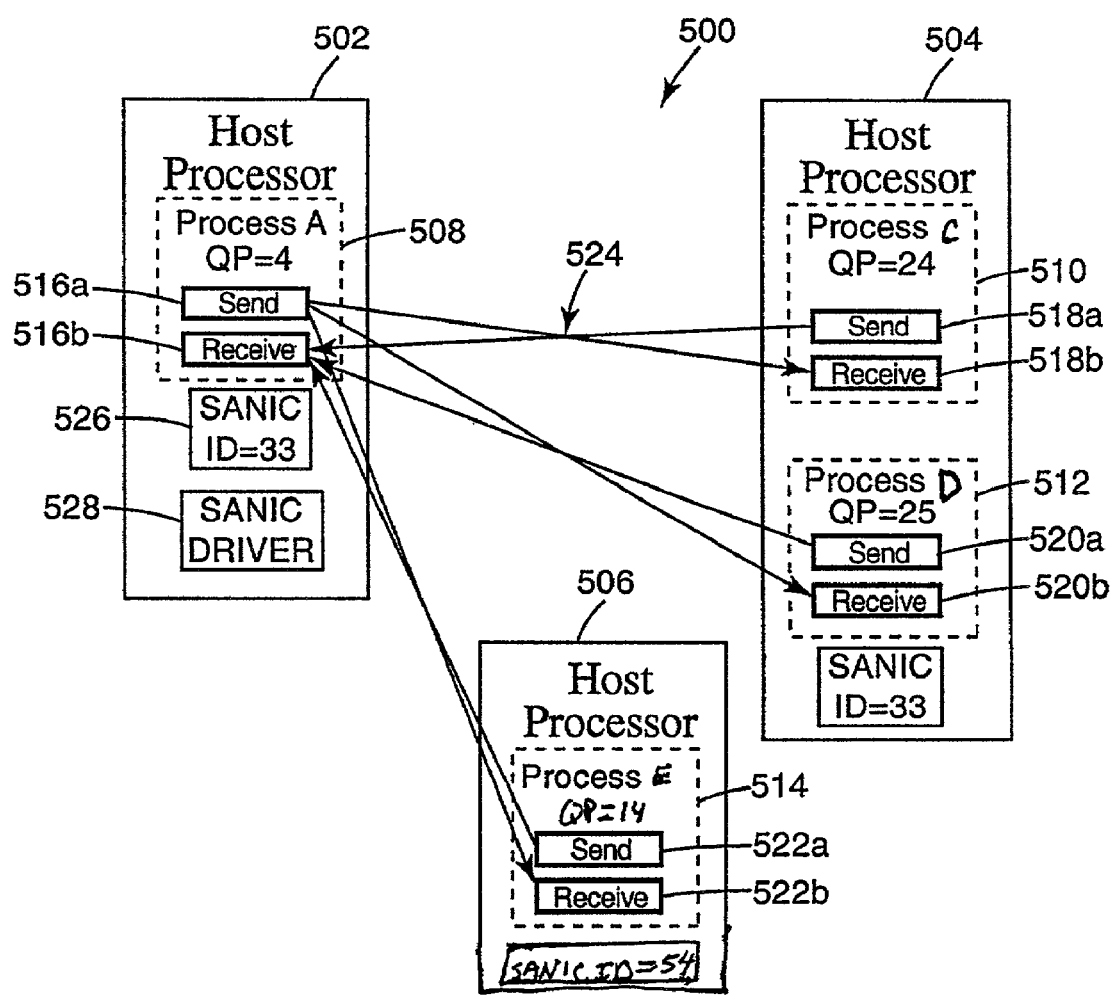
FIG. 12 is a diagram of a portion of a distributed computer system employing a reliable datagram service according to the present invention.

A portion of a distributed computer system 500 employing a reliable datagram service to communicate between distributed processes is illustrated generally from a software view of reliable datagram communication in FIG. 12. Distributed computer system 500 includes a host processor node 502, a host processor node 504, and a host processor node 506. Host processor node 502 includes a process A indicated at 508. Host processor node 504 includes a process C indicated at 510 and a process D indicated at 512. Host processor node 506 includes a process E indicated at 514.

Host processor node 502 includes QP 516 having send work queue 516*a* and receive work queue 516*b* for facilitating communication to and from process A indicated at 508. Host processor node 504 includes QP 518 having send work queue 518*a* and receive work queue 518*b* for facilitating communication from and to process C indicated at 510. Host processor node 504 includes QP 520 having send work queue 520*a* and receive work queue 520*b* for facilitating communication from and to process D indicated at 512. Host processor node 506 includes QP 522 having send work queue 522*a* and receive work queue 522*b* for facilitating communication from and to process E indicated at 514. In the reliable datagram service implemented in distributed computer system 500, the QPs are coupled in what is referred to as a connectionless transport service.

For example, the reliable datagram service employs SAN fabric 524 to couple QP 516 to QPs 518, 520, and 522. Specifically, the reliable datagram service couples send work queue 516*a* to receive work queues 518*b*, 520*b*, and 522*b*. The reliable datagram service also couples send work queues 518*a*, 520*a*, and 522*a* to receive work queue 516*b*.

The reliable datagram service permits a client process of one QP to communicate with any other QP on any other remote node. At a receive work queue, the reliable datagram service permits incoming messages from any send work queue on any other remote node.

In one embodiment, the reliable datagram service of a distributed computer system 500 employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless QPs communicating between a pair of endnodes. Each endnode requires at least one EE context for every endnode it wishes to communicate with in the reliable datagram service (e.g., a given endnode requires at least N EE contexts to be able to have reliable datagram service with N other endnodes).

The reliable datagram service of distributed computer system 500 greatly improves scalability because the reliable datagram service is connectionless. Therefore, an endnode with a fixed number of QPs can communicate with far more processes and endnodes with a reliable datagram service than with a reliable connection transport service. For example, if each of N host processor nodes contain M processes, and all M processes on each node wish to communicate with all the processes on all the other nodes, the reliable connection service requires $M^2 \times (N-1)$ QPs on each node. By comparison, the connectionless reliable datagram service only requires M QPs+(N-1) EE contexts on each node for exactly the same communications.

The EE contexts are each a special data structure which holds information to ensure the reception and sequencing of frames transported in the reliable datagram service. The EE contexts are initialized prior to sending messages.

The reliable datagram service employs use frame acknowledgment messages (e.g., ACK or NAK) as well as sequence numbers in the transport header to ensure the delivery of every frame, prevent duplicate frames and allow the detection of out of sequence or missing frames. Once detected, missing frames are retransmitted by the requester.

The reliable datagram service assumes incoming frames destined for a particular QP are in order. The SAN fabric 524, except for brief periods when it reconfigures itself, delivers frames in order. Out of order frames are essentially interpreted as missing frames. The endnodes, such as host processor nodes 502, 504, and 506, are not expected to reorder incoming out of order frames.

For the reliable datagram service, every request frames has a corresponding acknowledgment frame. In one embodiment SANIC, such as SANIC 526 in processor node 502, generates the acknowledgment frames. The far less common case of error recovery whereby frames are retransmitted which involve SANIC driver software, such as SANIC driver processor (SANIC driver) 528, scheduling the retransmitted frames.

NAK frames are used to respond to a failed request. NAKs are intended for error handling or error reporting when informing the requester can help solve the problem or provide debugging insight. For example, a NAK is generated for a sequence error detected on a reliable datagram QP. The NAK informs the requester to resend earlier frames. In one embodiment, NAK is not generated for certain failure/error conditions where the requested did not cause the failure/error condition and the requester can not ameliorate the failure/error condition, such as a checksum error or a routing element failure due to delivery of a frame to the incorrect destination node.

FKeys in Reliable Datagram Frames

The frame protection key (FKey) is used for: security; take ownership; and ghost frame suppression. With a reliable connection service, the FKey is associated with the QP state. Each QP maintains an FKey that is matched against incoming requests. The QP also maintains a second RKey to include in each outbound request.

But the reliable datagram presents a problem for the FKey. For outbound message request, the FKey must come from the client process (along with the destination ID, QP, etc. Inbound requests are more problematic relative to whether the inbound RKey should be associated with the client visible QP or with the connected SANIC—SANIC QP. Reliable datagrams use at least two QPs, one visible to the client process, and one connected to the destination. For ghost frame protection, the FKey in the frame needs to be associated with the SANIC—SANIC connected QP. But the other two stated benefits of FKeys require the incoming FKey in the frame to be compared against the FKey on the client visible QP instead.

The reliable datagram service of distributed computer system 500 provides a single QP to given client process, such as QP 508 for process A indicated at 508, that can be used to send messages to multiple QPs on other nodes, such as QPs 518 and 520 on host processor node 504 and QP 522 on host processor node 506. Similarly, incoming messages from multiple QPs can all be placed into the receive buffer of the receiving working queue. The reliable datagram service, like the reliable connection service, provides transparent error recovery.

In one embodiment for global headers, incoming reliable datagrams are identified by the presence of a SAN Fabric I/O architecture type field in both the local and global next header fields and the reliable datagram Opcodes in the transport header. In one embodiment, for local only headers, incoming reliable datagrams are identified by the presence of the SAN fabric I/O architecture type field in the local next header field in the local route header (LRH), and the reliable datagram Opcode in the transport header.

In one embodiment, incoming reliable datagrams are directed to a particular QP identified in the incoming frame. The source ID and QP are available in the receive buffer at the destination node for security and reliability checks.

WQEs posted to the send work queue in the reliable datagram QP mode contain the information needed to locate the desired destination node and QP.

QS attributes are associated with the QP, not the EE context. Thus, an EE context is required for each active virtual lane between endpoints. Accordingly, the virtual lane, as well as the destination information, is employed to point to the EE context.

Since EE context lookups depend on the local or global header type, and the virtual lane, and the number of contexts is typically limited in most designs to a likely "working set," rather than all possible connections, the EE context lookup typically requires a hash table. The hash table lookups can be performed in hardware or software. In one embodiment, software verbs introduce the concept of a destination "handle" to speed up the lookup process for either the hardware or software implementation. When using these destination handles, the destination handles are established at "EE open" error is reported if a WQE contains an invalid EE destination handle, either because the EE context is not "open" or because the open destination handle does not match the virtual lane of the QP. In one embodiment, the application programming interface or Verbs hide the existence of the EE context handle to simplify usage by the user.

The QP specified as a destination must be set up in reliable datagram mode. In one embodiment, an attempt to send to a QP in the wrong mode produces a NAK error.

The destination QP does not have to have the same QS attributes as the source QP. Acknowledgements and responses employ the virtual lanes of the source request, which are adjusted to be on the correct virtual lane for the responses.

In one embodiment, flits from different virtual lanes and different messages can be intermixed but targeting the same QP. Depending on implementation, the QP can have multiple open receive WQEs. An implementation that buffers up to a full frame for every receive virtual lane and port, can process whole frames at one time, and thereby require only a single message to be in progress at one time.

A reliable datagram QP guarantees that all data submitted for transfer arrives at a given destination QP exactly once, intact, and in the order submitted (i.e., strong ordering of frames guaranteed) in the absence of errors. A WQE is completed with a successful status only when the data is successfully delivered into the target memory location. If an error occurs that prevents the successful in-order, intact, exactly once delivery of the data into the target memory, the error is reported through the WQE completion mechanism. The Provider guarantees that, when an error occurs, no subsequent WQEs are processed after the WQE that caused the error. Transport errors are considered catastrophic and are typically extremely rare for Providers using the reliable datagram service according to the present invention.

In one embodiment, depending on the error handling options selected, errors can cause hardware to stop processing, and thereon is reported in a WQE on one or both ends of the reliable datagram service. In the case of SAN fabric errors, the transport operation is retried.

An error may optionally be delivered if a send frame is lost because the receive queue is empty. An error is reported to both ends of the reliable datagram service if the WQE at the head of the receive work queue is not of sufficient size to contain the data.

In one embodiment, errors that occur on the initiating system, such as WQE format errors or local memory protection errors, cause a WQE to be completed with an unsuccessful status with no data sent onto the network.

In one embodiment, errors that occur after a message is placed onto the SAN fabric, such as a transport error, hardware error, lost frame, reception error, or sequencing error, are delivered to the sender and cause a WQE to be completed with an unsuccessful status. Depending on the error, it may be reported at the sending side or both sides of the reliable datagram service.

In one embodiment, a send buffer or RDMA write WQE is completed with a successful status once the associated data has been successfully received by the remote endpoint. An RDMA read WQE is completed with a successful status once the requested data has been written to the target buffers on the initiator's node.

In one embodiment, the reliable datagram service does not guarantee the state or order of the memory state until a message is marked done. For send operations, this is true at both the sender and the receiver and nodes. For RDMA write operations, the sender and node must have the WQE completed before the remote end node can depend on the data. For RDMA read operations, the local side data state is not known until the WQE is marked done and reported with the appropriate verbs.

In one embodiment, the strong ordering rules required of the reliable datagrams service are maintained, and the design complexity of the reliable datagram services is reduced by sending frames on the SAN fabric one at a time with the requirement that each acknowledge be received at the sender end node before the next frame is started. An implication of this embodiment is that the reliable datagram service performs at a somewhat slower rate in SAN fabrics that have long links or large diameter and where only a single or few QPs are in use at one time. If the nodes are closely attached or only a few switch hops away, the performance loss should be unnoticeable. If may QPs are in use, the natural delays between scheduling the individual QPs will cover up the additional latency of operating in this mode.

In one embodiment, because there are potentially many QPs on a SANIC using the same EE context, and because the frames must be ACKed for each QP before another frame is sent. Dynamic striping is not done on frames using the reliable datagram service.

Figure 13:
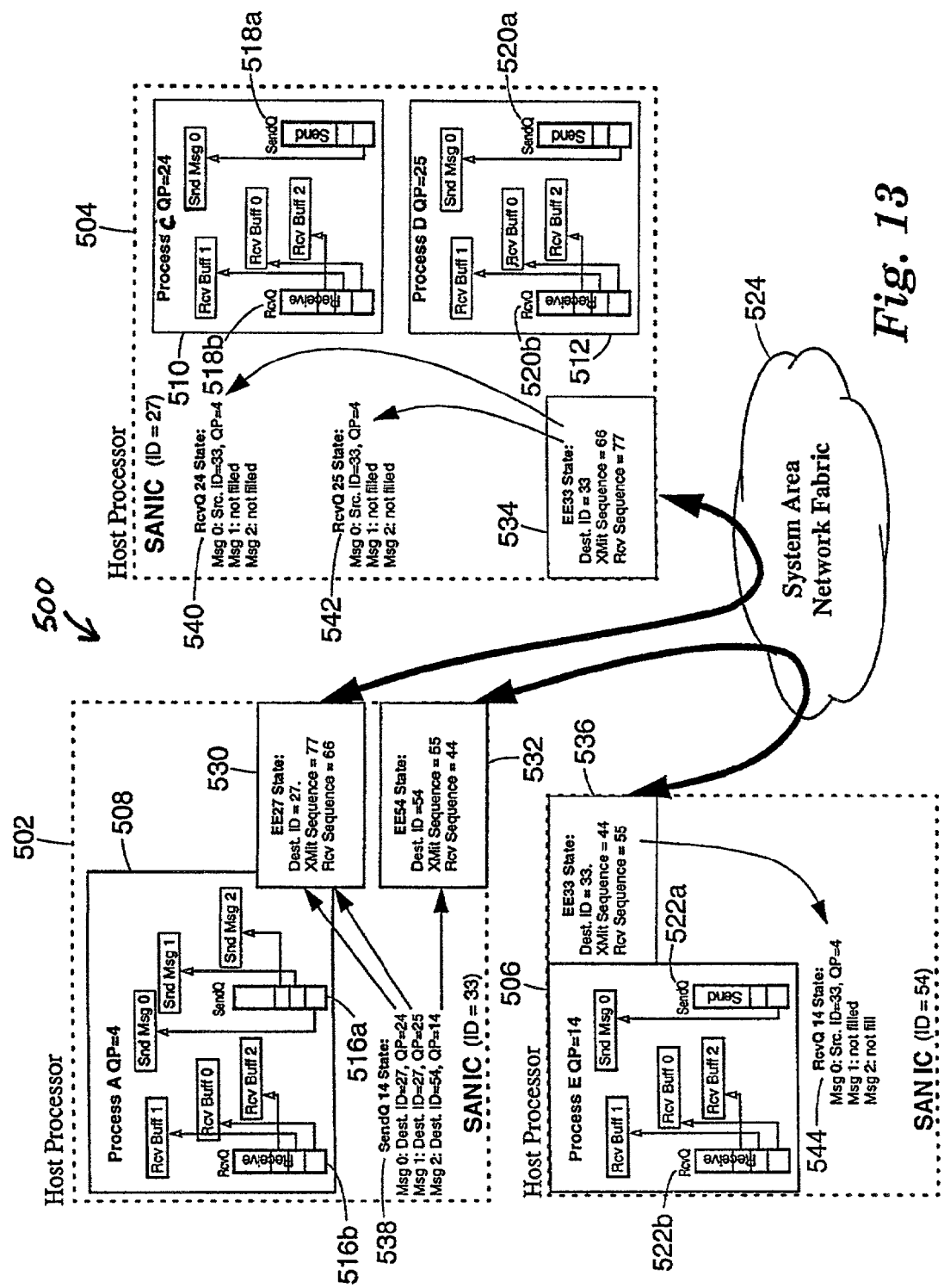
FIG. 13 is a more detailed view of the distributed computer system of FIG. 12 having a reliable datagram service according to the present invention.

A portion of distributed computer system 500 is illustrated in more detail in FIG. 13 to illustrate the multiple QPs used by hardware to synthesize the reliable datagram service. As illustrated in FIG. 13, host processor node 502 includes EE context state 530 corresponding to host processor node 504 and EE context state 532 corresponding to host processor node 506. Host processor node 504 includes EE context state 534 corresponding to host processor node 502. Host processor node 506 includes EE context state 536 corresponding to host process node 502.

Host processor node 502 includes send work queue state information indicated at 538. Host processor node 504 includes receive work queue state information indicated at 540. Host processor node 504 includes receive work queue state information indicated at 542. Host processor node 506 includes receive work queue state information indicated at 544.

In the example reliable datagram operation illustrated in FIG. 13, the send work queue state 538 indicates that message 0 has destination ID equal to 27 corresponding to SANIC ID equal to 27 of host processor 504 and QP equal to 24 corresponding to QP 518; message 1 is destined for SANIC ID 27 of host processor 504 and QP equal to 25 corresponding to QP 520; and message 2 having destination ID equal to 54 corresponding to SANIC ID 54 of host processor 506 and QP equal to 14 corresponding to QP 522. Receive work queue state 540 indicates message 0 source ID equal to 33 corresponding to SANIC ID in host processor 502 and QP equal to 4 corresponding to QP 516; message 1 not filled; and message 2 not filled. Receive work queue state 544 of host processor 504 indicates message 0 source ID equal to 33 corresponding to host processor 502 and QP equal to 4 corresponding to QP 516; message 1 not filled; and message 2 not filled. The receive work queue state 544 in host processor 506 indicates for message 0 the source ID equal to 33 corresponding to host processor 502 and QP equal to 4 corresponding to QP 516; message 1 not filled; and message 2 not filled.

In the reliable datagram operation of FIG. 13, EE context state 530 indicates destination ID equal to 27 corresponding to SANIC ID equal to 27 for host processor 504; the transmit sequence equal to 77 corresponding to the receive sequence equal to 77 in EE context state 534 of host processor 504; and the receive sequence equal to 66 corresponding to the transmit sequence equal to 66 in EE context state 534. Also, EE context state 534 includes destination ID equal to 33 corresponding to host processor 502 to thereby create an EE context connection between EE state 530 and EE state 534.

Similarly, EE context state 532 includes destination ID equal to 54 corresponding to SANIC ID equal to 54 in host processor 506; a transmit sequence equal to 55 corresponding to the receive sequence equal to 55 in EE context state 536 of host processor 506; and a receive sequence equal to 44 corresponding to the transmit sequence equal to 44 in the EE context state 536 of host processor 506. Also, the destination ID of EE context state 536 is equal to 33 corresponding to SANIC ID equal to 33 for host processor 502. Therefore, an EE context connection is made between EE state 532 and EE state 536.

Example Reliable Datagram Implementation

The reliable datagram service uses the QP hardware differently than the reliable connection service. With a reliable connection mode QP, the hardware need only look at state associated with the QP to determine such things as sequence numbers, the location of a buffer, the destination ID and destination QP number, and the like.

For the reliable datagram service, the user client process sees a single QP that is able to send and receive data from many sources. Nevertheless, to ensure reliable operations, the data is transferred over a separate, reliable connection between the source process and the desired destination process. In one embodiment, the required reliable connection for the reliable datagram interface is maintained by the SANIC driver and is shared by all reliable datagram traffic between the source and destination SANICs.

To support the shared connection for the reliable datagram service, software first creates one connection for each SANIC it communicates with. This connection establishes the data structures needed for sequence numbers and QS parameters to support the reliable communication. Error recovery for lost frames uses very similar techniques to those used for reliable communication. If a request frame is lost, the QP backs up and resends the QPs requests starting at, or even before, the missing request.

Example Outbound Request

In one example, outbound request, the client process of the reliable datagram service posts a send message, which includes: a gather list of virtual addresses that describes the send message; the destination ID or address; the destination frame protection key (F key); and if an RDMA operation, the remote (R Key) for the desired buffer is also included. When scheduled to send a frame, the SANIC examines the WQE for a destination ID, the determines the appropriate EE context to use. Hardware uses the local key (L Key) of the enqueuing process stored with the QP context and the virtual address of the work queue WQE. This allows the send work queue hardware to directly access the virtual address space of each process that posts send message buffers. The send work queue reads the data buffer, builds the frame header including the "Request Sequence" number associated with the EE context and puts the frame onto the link. The send work queue is serviced according to the same scheduling algorithm used for reliable connection QPs.

Example Inbound Request

In one embodiment, the inbound request accesses both per QP state associated with the target client's receive queue as well as the SANIC owned EE context that is connected to the source. This is necessary since inbound datagram traffic can arrive at more than one EE context from different sources and yet targets a single receive work queue.

The following lists the steps taken by the SANIC to process an incoming request frame:

The incoming request frame arrives and is determined to be uncorrupted.

The frame header specifies the destination QP number. This is the QP associated with the client process of the reliable datagram service. This QP points to the receive buffers but does not have any sequence number information. The sequence number information is stored with the EE context connected to the requesting host.

The incoming request's sequence number is compared against the state of the EE context connected to the requesting node. This EE state number is not in the incoming frame. Instead, the hardware determines this EE number by matching the Source ID or IPV6 address and virtual lane of the incoming frame with that of the EE connected to that Source ID on that particular virtual lane.

If the sequence number is correct, and the receive buffer is valid, the incoming request is written to (or in the case of an RDMA read, read from) memory.

Example Outbound Response

In an example of outbound response, after the inbound request is validated and memory is accessed, a response frame is sent back to the requestor acknowledging the incoming request frame.

Assuming the request is valid, the acknowledgement frame is generated after the request frame is committed to memory. For example, on an incoming send request frame, in one embodiment, the acknowledgement frame is generated after the send request frame is written to memory. In an alternative embodiment the acknowledgement is sent back to the requestor once the frame is committed to be written to memory. The requirement on the responding node is to generate the acknowledgement only after the request frame is written to the same fault zone as the processor.

Example Inbound Response

In an example of inbound response, a returning acknowledgement indicates the request was successfully completed. The originating SANIC matches the acknowledgement with the request. If an ACK is for the last frame of a message, and all previous frames were acked, the originating SANIC indicates to verbs the message is completed.

The inbound response is matched to an earlier request by comparing the original destination ID, QP, and sequence number in the returning response against all the outstanding requests.

Examples Guarantees of Delivery

The following are examples guaranteed of delivering of frames transmitted on the reliable datagram service according to the present invention. If a message is received and marked OK in the receive queue WQE, it is certain that is received correctly.

If a message is corrupted it will be dropped by the receiver, and no WQE is consumed. The sender has the responsibility to retry the operation and/or report the error. The message buffer in this case may be partially written, even though the WQE is not consumed, or is consumed by the later message. Buffer contents beyond the reported length of the operation are in an unknown state.

If a received send message is not corrupt, but has some format related error, the received message may be placed in memory, and a receive WQE consumed with the appropriate error code. Both send and receive sides are informed of these types of errors.

If a received RDMA message has a format or protection error, it may be placed in memory, in part or in whole, depending on the error, but no receive WQE is consumed. The sender is informed of the error in its send WQE. The receiver will also asynchronously place an error indication on the result queue.

Example Ordering Rules Implementation

The following are examples implementation details of one embodiment of the reliable datagram service accordingly to the present invention for assuming suitable ordering rules are maintained receive and send work queues are FIFO queues. WQEs are enqueued and dequeued in order. The SAN fabric provider does not reorder queues.

Receive queues are strict FIFO queues. Once enqueued, WQEs are processed, completed, and dequeued in FIFO order.

Send queues are FIFO queues. Once enqueued, WQEs are processed for sending in the order they were enqueued. The WQEs are completed in order whether they are targeting different destination QPs on same or a different endnode or the same destination QP. WQEs are always returned to the consumer process in FIFO order.

This does not mean that the data portions of the messages must arrive in any particular order, particularly for RDMA operations. As a result, the arrival order is not guaranteed until the message is marked complete on at least one side of the reliable datagram service.

In one embodiment, this example implementation, items queued on different QPs send queues on the same SANIC for the same destination endpoint or even the same destination QP are not ordered with respect to each other. For example, if WQE 'A' destined for destination and QP "X/75" is posted to QP 1, and WQE 'B' destined for destination and QP "X/75" is later posted to QP 2, there is not guarantee that 'A' will arrive before 'B' at the destination.

Message Level Flow Control

The following is an example embodiment of one suitable message level flow control implementation for reliable datagram service according to the present invention. A receiver not ready (RNR) type of NAK is used to indicate that the destination is unable to access the memory or other resources needed to complete the reliable datagram operation. The RNR type NAK is used in the cases where the destination software must be invoked to correct the situation. Examples are destination memory paged out, buffer not posted for send operations.

The general approach is for the sender to "poll" the receiver at regular intervals until the receiver clear up its problem, or the sender give up and fails the request. Endnodes should use this feature only rarely, as a mechanism to delay the incoming operation when some local resource is temporarily unavailable. Use of this mechanism consumes network bandwidth in that one or more incoming frames are aborted and re-sent. Note, however, that this mechanism is preferred over use of link level back pressure for delays of more than a few microseconds.

When getting a request frame that cannot be serviced, the receiver generates the RNR NAK.

The sequence that follows causes a short term stoppage of communication for all traffics using the EE context control and connection. This stoppage is designed to allow error recovery for al foreseen errors that might occur. Basically all frames in-flight are NAKed, a "resync" operation performed, and communication resumed. Since these operations are expected to be expected to be performed by hardware, recovery is very quick.

In particular, the EE context controlled connection is not pauses for the duration of the page fault or buffer shortage, although if multiple frames from different sending QPs target the same receiving QP, these multiple frames may also end up in the "polling" mode.

On getting this NAK, the sender suspends frame transmission, and starts the "RNR poll" timeout. The sender should also initialize a "RNR fail" counter. The "RNR poll" timeout must be greater than the "ACK Timeout".

Note that an RNR NAK stops operations on only the sending QP causing the error, except for the momentary "Resync" which effects all operations using the EE context controlled connection. Despite the fact that QPs share an EE context controlled connection the RNR does not cause other QPs to suspend operation.

In the normal situation, the receiver clears up the cause of the RNR, usually by getting software involved. Unlike for reliable connection mode, "restart" is not workable because there is no place for the receiver to store a list of very source that it may have hit it.

When the "RNR poll" timeout occurs, the sender attempts the same frame again. If the receiver is ready to resume operations, normal operation resumes, otherwise the receiver returns another RNR NAK.

Each time the "poll" fails, the "RNR Fail" counter decrements. When this counter reaches zero, the sender aborts the operation, marks the WQE done with error and terminates activity on the QP. The QP is restarted via software after coordination with both ends of the EE context controlled connection at this point.

The receiver informs its upper layer software the cause of the RNR (e.g. virtual memory) page not present, or receive buffer not posted) via an asynchronous interrupt describing the QP and other details. For virtual memory page not present, the operating system can load the page in preparation for the sender's retry. For Receive buffer not posted, a new buffer must be posted.

Frame Level Error Recovery

In one embodiment, error recovery for the reliable datagram service is very similar to that for the reliable connection service, one difference is that an error in any frame in the reliable datagram service causes the receiving destination to stop taking frames from all QPs coming from it matching source. As a result, it is necessary to maintain state that ties the destination back to the QP for error recovery in the reliable datagram service.

Receiver Response Actions

The following is one example embodiment for receiver response actions for frame error recovery in the reliable datagram service according to the present invention. Receivers getting frames with incorrect sequence number NAK them, reporting the sequence number from the request frame. The receiver only accepts the correct sequence number so any other frames in flight also end up getting NAKed.

In this embodiment, receivers that can't store data due to page out or buffer not ready must respond with a "RNR NAK" frame to the EE context/QP that caused the error. The RNR NAK causes the EE context controlled connection to go into the "RNR state". While in the RNR state, the EE context controlled connection continues to respond to all request with a "NAK sequence" until the "resync" frame arrives.

In this embodiment, receivers support a "Resync Command". This command is used for two purposes, to take a receiver out of the "RNR state", and to flush the SAN fabric of any other operations that may have preceded this command. To achiever both goals, the receiver replies to this frame with an ACK if the sequence number matches the receive sequence number. The receive sequence number is incremented as usual. If the sequence number does not match the receive sequence number, the sender and receiver have gotten out of synchronization, probably doe to a ghost frame or design flaw. The receiver must shut itself down, and stop responding to all incoming frames. The only recovery from this state is via management operations, such as the establishment of a new EE context controlled connection.

In this embodiment, the receiver supports an "Inquire" operation, with no side effects. When receiving this frame, the receiver must repeat the last ACK it generated exactly, with sequence number, QP and the like. The receiver does not change any state. If the last ACK was for an "RDMA read" or "FetchOp command," the data is not returned again, rather a "General ACK" is returned.

Sender Request Actions

The following is one example embodiment for sender request actions for frame level error recovery in the reliable datagram service according to the present invention. Senders are required to record the EE "Request Sequence" number, the EE context identifier, and the QP number of all outstanding frames. For discussion purposes this state is called the "Recovery State". This is used to assist in error recovery.

The recovery state can be stored together in any way suited to the implementation. Since there can be only a single outstanding transaction per QP, storing the recovery state with the QP state is one possibility. However, for error recovery, the recovery state must be rapidly scanned to locate the QP associated with each sequence number for the EE context in error, which suggests other organizations for storing the recovery state data.

In this embodiment, timeouts are performed for each outstanding transaction at each QP. On any timeout the sender cannot blindly retry the operation. The sender must instead, do an "inquire" command which is not sequenced. The receiver does not check the inquire command, and the sender should not update its "request sequence" or "expected sequence" numbers.

There can be only one of three possible responses from the point of view of the sender: ACK in sequence; ACK out of sequence; and timeout.

If the sender allows more than one outstanding frame for a particular EE context controlled connection, then the sender must rack an "expected sequence number" for the incoming ACKS.

Sender Response Actions

The following is one example embodiment for sender response actions for frame level error recovery in the reliable datagram service according to the present invention. The sender expects to get one of the following for every normal request frame: ACK in sequence; ACK out of sequence; NAK sequence; RNR NAK; or time-out, The ACK in sequence is the expected result for successful frames.

The ACK out of sequence is the result if an ACK was dropped. The sequence number will appear to match a later request frame than the currently expected ACK. The sequence number is checked to fall in the range between the "request sequence" number and the "expected sequence" number. If the sequence number does not, it should just be ignored and could be a result of a ghost frame.

The NAK sequence occurs if one or more request frames were lost. The sequence number appears to match a later request frame than the currently expected ACK. The sequence number is checked to fall in the range between the "request sequence" number and the "expected sequence" number. If the sequence number does not, it should just be ignored and could be a result of a ghost frame.

RNR NAK is returned to the sender EE context/QP which gets an RNR error at a destination EE context/QP.

The time-out occurs if the request or response was lost, and no other mechanism listed above caught the error. The time-out generally occurs when there is a long break between request frames and an error occurs at the same time.

Of course, it is possible that following the time-out, one or more delayed ACKs or NAKs could still arrive, so the mechanisms must take this into account.

The following describes the recovery actions taken in each of the above cases.

ACK in sequence is the normal response. The sender's EE context "expected sequence" number is incremented. The QP is located, and if acknowledged frame was not an "RDMA read" or "FetchOp Command," the frame is retired at the QP in the order it was posted. If the ACK was a "General ACK" and the frame being acknowledged was a "RDMA read" or "FetchOp Command," then the request cannot be completed, but must be marked so that these requests are repeated at the next scheduled opportunity. This occurs when the original ACK is dropped, followed by a time-out and the "inquire" frame. The result of the "inquire" frame is a general ACK, instead of the ACK with data expected.

In the ACK out of sequence, the sender got an ACK that is later than expected. The sender shall treat this as an aggregated ACK and locate all of the QPs that have an outstanding frame using the "Recovery State" and complete each QP as if the ACKs had arrived normally. If any of the QPs have an "RDMA Read" or "FetchOp Command" outstanding these QPs must be marked so that these requests are repeated at the next scheduled opportunity. This is because these operations return real data as ACKs, which must be recovered even if the ACK is lost. These operations also can be repeated with no side effects, unlike Sends.

In the NAK sequence, the NAK arrives that indicates that one or more request frames was lost. All outstanding request frames to the same destination end up being NAKed, and are re-sent. This is true for all QPs on the same source endorse that target the same destination endnode.

The sender must "push back" the "request sequence" number to match the "expected sequence" number of the expected ACK. The sender must also mark the EE context to be in "Resync state 1." While in "Resync state" 1 or 2, additional NAKs or ACKs are ignored until the "Resync" Acknowledgment occurs.

The sender must locate all QPs which have outstanding frames for this EE context by employing the "Recovery State," and reset the QPs to reschedule the lost frames for sending again.

When the first QP is scheduled to send a frame, the sender notes the EE context controlled is in "Resync State 1," and instead of sending the frame from the QP, it sends the "Resync Command" frame. The EE context is moved to "Resync state 2" where it waits for the ACK to the Resync or the time-out time to pass (this is checked whenever a QP tries to send something). The QP state remains set for normal sending, but the schedule time must be set for the normal ACK time-out to insure at least one QP is doing a time-out. Other QPs targeting the same EE context may proceed with normal frame transmission. When the ACK for the "Resync Command" frame arrives, the EE context moves to it normal running state. The QP context that sent the "Resync Command" should also be set to its normal running state but leave the "QP RNR state" alone if active. Since the QP did not actually send anything, the QP should be rescheduled for the next operation as normal.

In the RNR NAK, all outstanding request frames to the same destination end up being NAKed, and are re-sent. This is true for all QPs on the same source endnode that target the same destination device.

The sender must "push back" the "request sequence" number to match the "expected sequence" number of the expected ACK. It must also mark the EE context to be in "Resync state 1." While in "Resync state" 1 or 2, additional NAKS or ACKs are ignored until the "Resync" Acknowledgement occurs.

The sender must mark the QP referred to in the RNR NAK as "QP RNR state." When this QP next comes up for scheduling it must use the RNR poll time-out. This state must be combinable with the "Resync state" listed below so that both can be active at one time.

The sender must locate all other QPs which have outstanding frames for this EE context by using the "Recovery State," and reset them to reschedule the lost frames.

When the first QP is scheduled to send a frame, the sender notes that the EE context controlled connection is in "Resync State 1," and instead of sending the frame from the QP, the sender sends the "Resync Command" frame. The EE context is moved to "Resync state 2" where it waits for the ACK to the Resync or the time-out time to pass (this is checked whenever a QP tries to send something). The QP state remains set for normal sending, but the schedule time must be set for the normal ACK time-out to insure at least one QP is doing a time-out. Other QPs targeting the same EE context may proceed with the normal frame transmission. When the ACK for the "Resync Command" frame arrives, the EE context moves to it normal running state. The QP context that sent the "Resync Command" should also be set to its normal running state, but leave the "QP RNR state" alone if active. Since the QP did not actually send anything, the QP should be rescheduled for the next operation as normal.

Time-outs are implemented at each QP, such as part of the scheduler. For every frame that gets a time-out, the sender is not certain if the request or the response was lost. To tell the difference, the sender must send an "inquire" frame to the receiver. The sender does not change its state except as required to track the number or retries or time-outs. The sender must check the retry count, and if non-zero, decrement the retry count, send the "inquire" frame, and reset the time-out on the QP and EE state appropriately.

The "Resync State" involves sending and receiving another request and acknowledge pair. As a result, the potential exists for additional errors to occur. While in "Resync state 2" one of the following responses occurs:

In ACK sequence, the "resync" state is exited and return is made to normal operation.

ACK out of sequence occurs if the sender sent more than the "Resync Command" and the "resync" ACK (and others) was lost. In response, the "Expected Sequence" number is incremented, the "Resync state 2" is exited to normal state, and, if there are any more "Aggregated ACKs" to do, perform the actions specified above for the aggregated ACKs.

In NAK sequence, the "Resync Command" frame and potentially other frames are lost. In response, NAK action is started exactly as described above for the NAK sequence.

RNR NAK only occurs if, while processing a time-out in "Resync state" the receiver lost the "Resync Command" but got the "Inquire." In response, take the actions described above for RNR NAK.

In time-outs, perform the actions described above for time-out.

In one form of this embodiment, time-outs are done with a single timer per QP. This timer measures the time since the last request frame sent, if no ACKs are outstanding, or the last valid ACK frame arrived, if more frames are outstanding. This allows normal time-outs on intermittent frames measured from request. It also provides an individual frame time-out that can be longer than N times normal for frames sent while the timer is already running where N is the number of outstanding frames. This is calculated assuming that each outstanding ACK arrives just before a time-out from the previous, and the requests were made very close together. With this implementation, network congestion short of deadlock is less likely to activate the time-out.

Ghost Frame Recovery

The following is one example embodiment for ghost frame recovery in the reliable datagram service according to the present invention. If a "ghost" request frame arrives, unless the ghost frame matches the exact receiver sequence number, the ghost frame is NAKed (or dropped if other parameters, such as the SLID or Fkey make no sense). There is a very low probability that this will cause trouble at the receiver.

If a "Ghost" NAK frame arrives potentially due to a ghost request frame at the receiver, the ghost frame must fall between the "Expected Sequence" and "Request Sequence" numbers or the ghost frame is dropped. If the ghost frame is between these numbers, the ghost frame triggers a NAK error recovery, causing a resync and an attempt to retransmit already transmitted frames. This causes the sender and receiver sequence numbers to get out of order which causes the context controlled connection to be broken for software to recover. No bad frames will make it to the receiver.

If a "Ghost" ACK frame arrives at the sender, the ghost frame must fall between the "Expected Sequence" and "Request Sequence" numbers or the ghost frame is dropped. If the ghost frame is between these numbers, the ghost frame triggers an "aggregated ACK" recovery mechanism. This causes frames that have not really been acknowledged to be marked as such. When the real acknowledgments arrive, they are dropped. This can cause errors, but only if one or more of the real acknowledgments was in fact another error or RNR. This will not be caught or corrected by the hardware.

Automatic Retry Controls

The following is one example embodiment of suitable automatic retry controls for the reliable datagram service according to the present invention. Automatic error recovery for reliable datagrams is checked each time the sender endnode prepares to send a "resync" or "inquire" command. The first time either of these commands is attempted, the sender endnode loads the retry state from policy controls. Each subsequent time either of these commands is attempted, the retry state is checked for expiration and updated.

In this example embodiment, there are two automatic retry controls to allow: 1) repeating the frame on same route; and 2) retrying the frame on a different route. In one form of this embodiment, two controls in the EE state enable these functions.

QP_Retry_Count 0=no retry, 1=retry once, etc. On retry limit, do Route retry policy.

QP_Route_Retry 0=no retry, 1=Flip the X_Y path control. On flipping the X_Y, this bit is reset to 0, requiring software to re-enable it and potentially do other clean-up or re-route.

With the above controls both enabled, the SANIC could potentially retry the frame up to QP_Retry_Count times on each of two routes before failing the operation.

If the QP_Retry_Count is zero, but the QP_Route_Retry is enabled, the SANIC attempts a frame on each of the preset routes, one time before failing the operation. Note that after the first failure occurs, the SANIC causes an asynchronous interrupt to the driver to allow the QP_Route_Retry bit to be reset.

If the QP_Route_Retry is zero, no attempt will be made to try a different route. The only route that data is sent on, is the one pointed by the X_Y control. The acceptable sources for incoming data are either the X or Y routes.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A distributed computer system comprising:
 a source endnode including:
  a source process which produces message data; and
  a send work queue having work queue elements that describe the message data for sending;
 a first destination endnode including:
  first and second destination processes;
  a first receive work queue corresponding to the first destination process; and
  a second receive work queue corresponding to the second destination process;
 a second destination endnode including:
  a third destination process; and
  a third receive work queue corresponding to the third destination process, wherein each of the first, second, and third receive work queues have work queue elements that describe where to place incoming message data; communication fabric providing communication between the source endnode and the first and second destination endnodes;
 a first end-to-end context at the source endnode and the first destination endnode storing state information to ensure the reception and sequencing of message data sent from the source endnode to the first destination endnode thereby facilitating reliable datagram service between the source process and the first and second destination processes; and
 a second end-to-end context at the source endnode and the second destination endnode storing state information to ensure the reception and sequencing of message data sent from the source endnode to the second destination endnode thereby facilitating reliable datagram service between the source process and the third destination process.

2. The distributed computer system of claim 1 wherein the source endnode includes a network interface controller which packetizes the message data into frames.

3. The distributed computer system of claim 2 wherein the destination endnode includes a network interface controller which acknowledges receipt of frames sent from the source endnode.

4. The distributed computer system of claim 3 wherein the network interface controller and the end-to-end context portion in the destination endnode ensures strong ordering of received frames sent from the source endnode, such that the frames are received in a same defined order as transmitted from the source endnode.

5. The distributed computer system of claim 3 wherein the source endnode retransmits frames that are not successively acknowledged in the reliable datagram service.

6. The distributed computer system of claim 3 wherein the network interface controller in the destination endnode generates cumulative acknowledgments.

7. The distributed computer system of claim 3 wherein the network interface controller in the destination endnode generates acknowledgments on a per frame basis.

8. The distributed computer system of claim 2 wherein the end-to-end context stores state information to keep track of sequence numbers to detect out of sequence or missing frames sent from the source endnode to the destination endnode.

9. The distributed computer system of claim 3 wherein the end-to-end context stores state information to keep track of acknowledgments sent from the destination endnode.

10. The distributed computer system of claim 3 wherein the end-to-end context stores state information to keep track of time out values.

11. A method of sending message data via a reliable datagram service from a source endnode to first and second destination endnodes in a distributed computer system, the method comprising:
 producing message data with a source process at the source endnode;
 describing the message data for sending with work queue elements in a send work queue at the source endnode;
 describing where to place incoming message data with work queue elements in first and second receive work queues at the first destination endnode;
 describing where to place incoming message data with work queue elements in a third work queue at the second destination endnode;
 storing state information in a first end-to-end context at the source endnode and the first destination endnode to ensure the reception and sequencing of message data sent from the source endnode to the first destination endnode;
 storing state information in a second end-to-end context at the source endnode and the second destination endnode to ensure the reception and sequencing of message data sent from the source endnode to the second destination endnode;
 sending message data via the reliable datagram service between the source process and the first and second destination processes, wherein the reliable datagram service is controlled by the state information stored in the first end-to-end context; and
 sending message data via the reliable datagram service between the source process and the third destination process, wherein the reliable datagram service is controlled by the state information stored in the second end-to-end context.

12. The method of claim 11 further comprising:
 packetizing, at the source endnode, the message data into frames.

13. The method of claim 12 further comprising:
 acknowledging, at the destination endnode, receipt of frames sent from the source endnode.

14. The method of claim 13 further comprising:
ensuring strong ordering of received frames sent from the source endnode, such that the frames are received in a same defined order as transmitted from the source endnode.

15. The method of claim 13 further comprising:
retransmitting frames that are not successively acknowledged in the reliable datagram service.

16. The method of claim 13 wherein the acknowledging, at the destination endnode, includes generating cumulative acknowledgments.

17. The method of claim 13 wherein the acknowledging, at the destination endnode, includes generating acknowledgments on a per frame basis.

18. The method of claim 12 wherein the stored state information in the end-to-end context keeps track of sequence numbers to detect out of sequence or missing frames sent from the source endnode to the destination endnode.

19. The method of claim 12 wherein the stored state information in the end-to-end context keeps track of acknowledgments sent from the destination endnode.

20. The method of claim 12 wherein the stored state information in the end-to-end context keeps track of time out values.

* * * * *